US010692378B2

(12) United States Patent
Shoda et al.

(10) Patent No.: US 10,692,378 B2
(45) Date of Patent: Jun. 23, 2020

(54) INFORMATION COLLECTION METHOD, INFORMATION COLLECTION SYSTEM, AND NON-TRANSITORY COMPUTER-READABLE RECORDING MEDIUM STORING INFORMATION COLLECTION PROGRAM

(71) Applicant: Panasonic Intellectual Property Corporation of America, Torrance, CA (US)

(72) Inventors: Yukie Shoda, Osaka (JP); Toru Tanigawa, Osaka (JP); Junichi Imoto, Osaka (JP); Yusuke Tsukamoto, Osaka (JP); Hidetsugu Maekawa, Nara (JP); Tetsuji Fuchikami, Osaka (JP); Seiya Imomoto, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/527,090

(22) Filed: Jul. 31, 2019

(65) Prior Publication Data

US 2020/0043341 A1 Feb. 6, 2020

(30) Foreign Application Priority Data

Aug. 3, 2018 (JP) .................................. 2018-146889

(51) Int. Cl.
*B60K 28/02* (2006.01)
*G08G 1/16* (2006.01)
(Continued)

(52) U.S. Cl.
CPC ............. *G08G 1/162* (2013.01); *B60W 40/09* (2013.01); *B60W 2040/0872* (2013.01)

(58) Field of Classification Search
CPC ......... G05D 1/0088; G05D 2201/0213; G05D 1/0027; G05D 1/0038; G05D 1/0044;
(Continued)

(56) References Cited

U.S. PATENT DOCUMENTS 5,808,372 A * 9/1998 Schwegler .............. B60R 25/04
307/10.4
5,838,251 A * 11/1998 Brinkmeyer ............ B60R 25/04
340/5.22
(Continued)

FOREIGN PATENT DOCUMENTS

JP 2017-182490 10/2017

*Primary Examiner* — Daniel Previl
(74) *Attorney, Agent, or Firm* — Greenblum & Bernstein, P.L.C.

(57) ABSTRACT

In an information collection method of the present disclosure, a processor of an information collection system acquires event sensor data and identification information from an on-vehicle terminal or a passenger terminal, the event sensor data being output, in response to an event trigger, from an on-vehicle sensor mounted on the on-vehicle terminal or a passenger sensor mounted on the passenger terminal, the identification information identifying an output source of the event sensor data, identifies the passenger terminal associated with the identification information when the identification information indicates the on-vehicle terminal, identifies the on-vehicle terminal associated with the identification information when the identification information indicates the passenger terminal, requests sensor data from the identified passenger terminal or on-vehicle terminal, acquires the sensor data from a request destination, and stores the event sensor data and the sensor data in association with each other in a second memory as dangerous driving information.

6 Claims, 11 Drawing Sheets

(51) Int. Cl.
*B60W 40/09* (2012.01)
*B60W 40/08* (2012.01)

(58) Field of Classification Search
CPC .. G05D 1/0011; G05D 1/0055; G05D 1/0261; G05D 1/0297; G05D 2201/0216; G07C 5/008; G07C 5/085; G07C 5/00; G07C 5/004; G07C 5/0808; G07C 9/28; G06F 3/04842; G06F 1/1639; G06F 3/017; G06F 3/0481; G06F 16/284; G06F 3/14; H04L 67/12; H04L 63/083; H04L 63/0861; H04L 12/12; H04L 12/2818; H04L 12/282; H04L 63/104; H04L 63/105; H04L 63/107; H04L 67/125; H04L 67/18; B60N 2/002; B60N 2/0228; B60N 2/2863; B60W 2530/00; B60W 40/08; B60W 10/04; B60W 10/20; B60W 2420/42; B60W 2420/52; B60W 30/0956; B60W 40/04; B60W 50/0097; B60W 50/14; B60W 2050/0215; B60W 2040/0872; B60W 2556/50; B60W 30/18154; B60W 40/09; H01M 10/052; H01M 10/0525; H01M 10/48; H01M 2220/20; G06K 9/00805; G06K 9/00; G06K 9/3233; G06K 9/00288; G06K 9/00335; G06K 9/00785; G06K 9/00791; G06K 9/00798; G06K 9/2018; G06K 9/00087; G06K 9/00617; G06K 9/00832; G01S 13/931; G01S 15/931; G01S 17/931; G01S 17/89; G01S 17/86; G01S 19/11; G01S 19/17; G01S 19/41; G01S 19/42; G01S 19/50; G01S 2013/9315; G01S 2013/9316; G01S 2013/9318; G01S 2013/93185; G01S 2013/9319; G01S 2013/932; G01S 2013/9321; G01S 2013/9322; G01S 2013/93271; G01S 2013/93272; G01S 2013/93273; G01S 2013/9329; G01C 21/3415; G01C 21/3697; G01C 21/34; G01C 21/3667; G01C 21/362; G01C 21/3438; G01C 21/3484; G01C 21/3492; G01C 21/20; G08G 1/166; G08G 1/202; G08G 1/0112; G08G 1/0129; G08G 1/00; G08G 1/0141; G08G 1/096716; G08G 1/096775; G08G 1/005; G08G 1/0145; G08G 1/017; G08G 1/123; G08G 1/161; G08G 1/162; G08G 1/163; G08G 1/164; H04W 4/02; H04W 4/024; H04W 4/48; H04W 12/06; H04W 4/44; H04W 4/80; H04W 12/0608; H04W 12/08; H04W 4/90; H04W 84/00; H04W 4/023; G06Q 10/047; G06Q 50/30; G06Q 10/10; G06Q 10/02; G06Q 10/08; G06Q 10/025; G06Q 10/083; G06Q 10/20; G06Q 20/145; G06Q 30/02; G06Q 30/0206; G06Q 30/0283; B60R 16/037; B60R 25/241; B60R 25/25; B60R 25/01; B60R 25/252; B60R 25/255; B60R 25/257; B60R 25/30; H04B 11/00; G05B 15/02; G05B 19/00; G05B 2219/163; G05B 2219/2642; G09G 2354/00; G09G 2380/12; G09G 3/002; G09G 3/32; G09G 2320/10; G09G 2340/12; G09G 2380/10; G09G 3/003; Y02D 50/40; B60H 1/00735; B60H 1/00742; B60H 1/00757; B60H 1/00971; B60L 15/20; B60L 2250/10; B60L 2260/32; B60L 53/11; B60L 53/14; B60L 53/305; B60L 53/31; B60L 53/35; B60L 53/37; B60L 53/38; B60L 53/65; B60L 53/665; B60L 55/00; B60L 58/12; B60Q 1/30; B60Q 3/00; B60Q 1/28; B60Q 5/00; B60Q 5/005; B60Q 5/006; B64D 11/0015; B64D 11/0605; B64D 2045/007; B64D 45/00; F41A 17/08; G06T 19/006; G06T 2207/30201; G06T 2207/30252; G06T 7/73; G07B 15/00; G10L 15/22; G10L 15/30; G10L 17/22; H04M 1/6075; H04M 2250/02; H04N 5/7408; H04N 9/31; H04N 9/3141; H04R 1/08; H04R 2499/13; H04R 3/12; H04R 5/023; H04R 5/027; H04S 7/302; B25J 11/00; B60T 17/18; B60T 2270/40; B60T 2270/82; B60T 7/16; B60T 7/18; B60T 8/17; B66B 1/2408; B66B 1/3476; B66B 1/468; B66B 2201/4607; B66B 2201/4638; B66B 2201/4661; B66B 5/0012; E05F 15/40; E05F 15/60; E05F 15/611; E05F 15/73; E05Y 2400/44; E05Y 2400/45; E05Y 2400/458; E05Y 2900/518; E05Y 2900/531; F02D 2250/24; F02D 31/001; F02D 31/003; F02D 37/02; F02D 41/0002; F02D 41/0245; F02D 41/0255; F02D 41/08; F02N 2200/106; F02P 5/045; F02P 5/1508
USPC ........ 340/576, 901–903, 905, 426.1, 426.28, 340/425.5, 426.24
See application file for complete search history.

(56) References Cited

U.S. PATENT DOCUMENTS

| | | | | |
|---|---|---|---|---|
| 5,959,572 | A * | 9/1999 | Higashimata | G08G 1/166 342/70 |
| 8,996,234 | B1 * | 3/2015 | Tamari | G07C 5/085 701/29.3 |
| 10,032,318 | B1 * | 7/2018 | Ferguson | B60R 1/00 |
| 2002/0198632 | A1 * | 12/2002 | Breed | G08G 1/164 701/1 |
| 2006/0230108 | A1 * | 10/2006 | Tatsuta | A61B 5/02055 709/204 |
| 2011/0213628 | A1 * | 9/2011 | Peak | G06Q 40/08 705/4 |
| 2012/0123806 | A1 * | 5/2012 | Schumann, Jr. | G06Q 40/08 705/4 |

* cited by examiner

INFORMATION COLLECTION METHOD, INFORMATION COLLECTION SYSTEM, AND NON-TRANSITORY COMPUTER-READABLE RECORDING MEDIUM STORING INFORMATION COLLECTION PROGRAM

FIELD OF THE INVENTION

The present disclosure relates to an information collection technique for collecting dangerous driving information representing dangerous driving.

BACKGROUND ART

A technique for supporting objective analysis of a cause of a traffic accident has been known (for example, JP-A-2017-182490). In a technique described in. JP-A-2017-182490, an accident vehicle and an accident related vehicle are identified based on an accident occurrence time and an accident occurrence position, and operation history information of the identified accident vehicle and the identified accident related vehicle is extracted. Based on the extracted operation history information, driving situations of the accident vehicle and the accident related vehicle before the accident occurs are identified. Then, by comparing the driving situations of the accident vehicle and the accident related vehicle, objective analysis of a cause of the accident is supported.

SUMMARY OF THE INVENTION

In the above-mentioned background art, the operation history information for identifying a driving condition is output from an on-vehicle terminal mounted on the accident vehicle or the accident related vehicle. However, when a driving situation is identified only by the information output from the on-vehicle terminal, it is difficult to accurately determine whether or not dangerous driving is performed. Therefore, it is required to improve the accuracy in determining whether or not dangerous driving is performed using information from a device other than the on-vehicle terminal.

An information collection method according to an aspect of the present disclosure is an information collection method used in an information collection system for collecting dangerous driving information indicating that driving of a vehicle performed by a driver is dangerous driving, wherein a processor of the information collection system:

acquires event sensor data and identification information from an on-vehicle terminal or from a passenger terminal, the event sensor data being sensor data output, in response to a predetermined event trigger relating to the dangerous driving, from an on-vehicle sensor mounted on the on-vehicle terminal or from a passenger sensor mounted on the passenger terminal held by a passenger riding on the vehicle with the driver, the identification information identifying an output source of the event sensor data;

identifies, in a case where the acquired identification information indicates the on-vehicle terminal, the passenger terminal associated with the acquired identification information with reference to a first memory, the first memory storing identification information of the on-vehicle terminal and identification information of the passenger terminal in association with each other;

identifies, in a case where the acquired identification information indicates the passenger terminal, the on-vehicle terminal associated with the acquired identification information with reference to the first memory;

requests sensor data from the identified passenger terminal or from the identified on-vehicle terminal;

acquires the sensor data from the passenger terminal or from the on-vehicle terminal which is a request destination from which the sensor data has been requested; and stores the acquired event sensor data and the sensor data acquired from the request destination in association with each other in a second memory as the dangerous driving information.

According to the information collection technique of the present disclosure, it is possible to improve the accuracy in determining whether or not dangerous driving is performed using information from a device other than the on-vehicle terminal.

Figure 1:
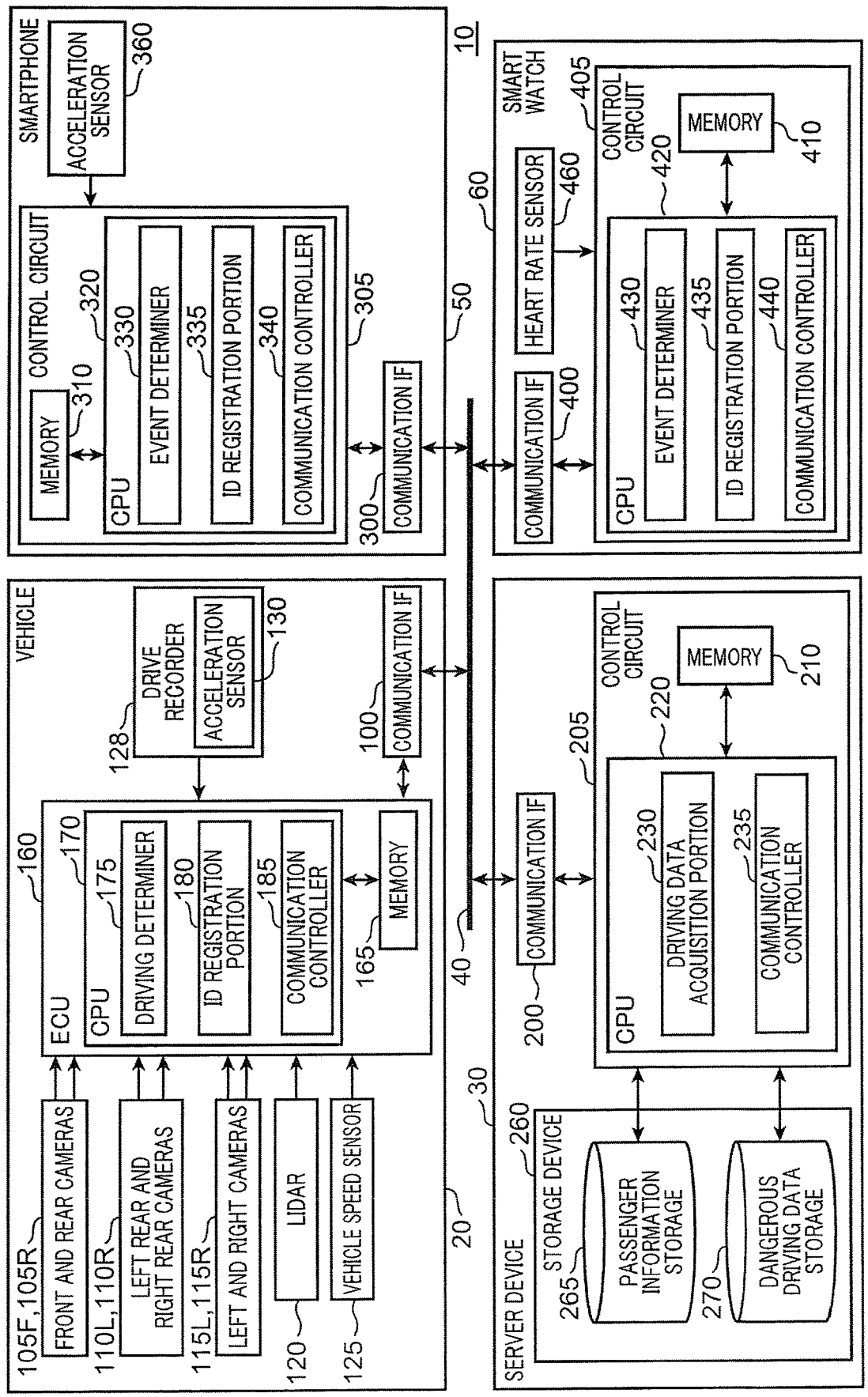
FIG. 1 is a block diagram schematically showing a configuration of an information collection system according to a first embodiment.

DESCRIPTION OF EMBODIMENTS (History of Inventing One Aspect According to the Present Disclosure)

First, a viewpoint of one aspect according to the present disclosure will be described. As described above, in the technique described in JP-A-2017-182490, the operation history information for identifying a driving situation is only output from the on-vehicle terminal mounted on the accident vehicle or the accident related vehicle. Therefore, it is difficult to accurately determine whether or not dangerous driving has been performed. On the other hand, in recent years, a passenger who rides on a vehicle with a driver often has various portable devices (hereinafter referred to as a "passenger terminal") capable of collecting information representing dangerous driving. In view of the above, it is possible to determine whether or not dangerous driving is performed using sensor data output from a sensor mounted on such a passenger terminal.

When the passenger terminal is used in addition to the on-vehicle terminal, even if the on-vehicle terminal determines that normal driving is performed, the passenger terminal may determine that dangerous driving is performed due to reasons, such as that a type and characteristics of a mounted sensor are different, variations in detection accuracy of a sensor are different, a determination algorithm (for example, a determination threshold for sensor data) is different, and the like. In such a case, since the on-vehicle terminal determines that the driving is normal driving, sensor data of the on-vehicle terminal conventionally has not been able to be collected, and has been lost.

On the other hand, if a configuration is made so that sensor data of the on-vehicle terminal is acquired when the passenger terminal determines that dangerous driving is performed, it is possible to collect sensor data, based on which the on-vehicle terminal determines that normal driving is performed while the passenger terminal determines that dangerous driving is performed. Conversely, there may be a case where the passenger terminal determines that normal driving is performed while the on-vehicle terminal determines that dangerous driving is performed. In this case, if a configuration is made so that sensor data of the passenger terminal is acquired when the on-vehicle terminal determines that dangerous driving is performed, it is possible to collect sensor data, based on which the passenger terminal determines that normal driving is performed while the on-vehicle terminal determines that dangerous driving is performed. As described above, it has been found that by using sensor data of the passenger terminal in addition to sensor data of the on-vehicle terminal, it is possible to improve determination accuracy as to whether or not dangerous driving is performed. Based on the above consideration, the inventor of the present disclosure has conceived aspects of the invention described below.

An information collection method according to a first aspect of the present disclosure is an information collection method used in an information collection system for collecting dangerous driving information indicating that driving of a vehicle performed by a driver is dangerous driving, wherein a processor of the information collection system:
    acquires event sensor data and identification information from an on-vehicle terminal or from a passenger terminal, the event sensor data being sensor data output, in response to a predetermined event trigger relating to the dangerous driving, from an on-vehicle sensor mounted on the on-vehicle terminal or from a passenger sensor mounted on the passenger terminal held by a passenger riding on the vehicle with the driver, the identification information identifying an output source of the event sensor data;
    identifies, in a case where the acquired identification information indicates the on-vehicle terminal, the passenger terminal associated with the acquired identification information with reference to a first memory, the first memory storing identification information of the on-vehicle terminal and identification information of the passenger terminal in association with each other;
    identifies, in a case where the acquired identification information indicates the passenger terminal, the on-vehicle terminal associated with the acquired identification information with reference to the first memory;
    requests sensor data from the identified passenger terminal or from the identified on-vehicle terminal;
    acquires the sensor data from the passenger terminal or from the on-vehicle terminal which is a request destination from which the sensor data has been requested; and
    stores the acquired event sensor data and the sensor data acquired from the request destination in association with each other in a second memory as the dangerous driving information.

An information collection system according to a second aspect of the present disclosure is an information collection system for collecting dangerous driving information indicating that driving of a vehicle performed by a driver is dangerous driving, the information collection system includes:
    a first acquisition portion configured to acquire event sensor data and identification information from an on-vehicle terminal or from a passenger terminal, the event sensor data being sensor data output, in response to a predetermined event trigger relating to the dangerous driving, from an on-vehicle sensor mounted on the on-vehicle terminal or from a passenger sensor mounted on the passenger terminal held by a passenger riding on the vehicle with the driver, the identification information identifying an output source of the event sensor data;
    a first memory configured to store identification information of the on-vehicle terminal and identification information of the passenger terminal in association with each other;
    a first identification portion configured to identify, in a case where the acquired identification information indicates the on-vehicle terminal, the passenger terminal associated with the acquired identification information with reference to the first memory;
    a second identification portion configured to identify, in a case where the acquired identification information indicates the passenger terminal, the on-vehicle terminal associated with the acquired identification information with reference to the first memory;
    a requesting portion configured to request sensor data from the identified passenger terminal or from the identified on-vehicle terminal;
    a second acquisition portion configured to acquire the sensor data from the passenger terminal or from the on-vehicle terminal which is a request destination from which the sensor data has been requested; and
    a second memory configured to store the dangerous driving information; and
    a storage controller configured to store the acquired event sensor data and the sensor data acquired from the request destination in association with each other in the second memory as the dangerous driving information.

A non-transitory computer-readable recording medium according to a third aspect of the present disclosure stores an information collection program used in an information collection system for collecting dangerous driving information indicating that driving of a vehicle performed by a driver is dangerous driving, the program causing a processor of the information collection system to execute:
    processing of acquiring event sensor data and identification information from an on-vehicle terminal or from a passenger terminal, the event sensor data being sensor data output, in response to a predetermined event trigger relating to the dangerous driving, from an on-vehicle sensor mounted on the on-vehicle terminal or from a passenger sensor mounted on the passenger terminal held by a passenger riding on the vehicle with the driver, the identification information identifying an output source of the event sensor data;

processing of identifying, in a case where the acquired identification information indicates the on-vehicle terminal, the passenger terminal associated with the acquired identification information with reference to a first memory, the first memory storing identification information of the on-vehicle terminal and identification information of the passenger terminal in association with each other;

processing of identifying, in a case where the acquired identification information indicates the passenger terminal, the on-vehicle terminal associated with the acquired identification information with reference to the first memory;

processing of requesting sensor data from the identified passenger terminal or from the identified on-vehicle terminal;

processing of acquiring the sensor data from the passenger terminal or from the on-vehicle terminal which is a request destination from which the sensor data has been requested; and processing of storing the acquired event sensor data and the sensor data acquired from the request destination in association with each other in a second memory as the dangerous driving information.

According to the first aspect, the second aspect, or the third aspect, not only the data detected by the on-vehicle sensor but also the data detected by the passenger sensor can be stored in the second memory as the dangerous driving information. As a result, improvement in the accuracy of determining whether or not dangerous driving is performed can be achieved.

In addition, in the first aspect described above, for example, in the acquisition of the event sensor data, an acceleration of the vehicle output from the on-vehicle sensor in response to the event trigger, in which an absolute value of an acceleration of the vehicle detected by the on-vehicle sensor exceeds a predetermined on-vehicle threshold value, may be acquired as the event sensor data, or an acceleration of the vehicle output from the passenger sensor in response to the event trigger, in which an absolute value of an acceleration of the vehicle detected by the passenger sensor exceeds a predetermined terminal threshold value, may be acquired as the event sensor data.

In the present aspect, when the on-vehicle threshold value and the terminal threshold value are different, an acceleration of a vehicle may be acquired as the event sensor data from only one of the on-vehicle sensor and the passenger sensor. However, even in such a case, the acceleration of the vehicle is obtained as the sensor data from the other sensor, and both pieces of the data are stored in the second memory as the dangerous driving information. Therefore, according to the present aspect, improvement in the accuracy of determining whether or not dangerous driving is performed can be achieved.

In addition, in the first aspect described above, for example, in the acquisition of the event sensor data, an acceleration of the vehicle output from the on-vehicle sensor in response to the event trigger, in which an absolute value of an acceleration of the vehicle detected by the on-vehicle sensor exceeds a predetermined on-vehicle threshold value, may be acquired as the event sensor data, or heart rate data of the passenger output from the passenger sensor in response to the event trigger, in which a difference between heart rate data of the passenger detected by the passenger sensor and heart rate data in normal times exceeds a predetermined heart rate threshold value, may be acquired as the event sensor data.

In the present aspect, an acceleration of a vehicle or heart rate data of a passenger may be obtained as the event sensor data from only one of the on-vehicle sensor and the passenger sensor. However, even in such a case, the heart rate data of the passenger or the acceleration of the vehicle is acquired as the sensor data from the other sensor, and both pieces of the data are stored in the second memory as the dangerous driving information. Therefore, according to the present aspect, improvement in the accuracy of determining whether or not dangerous driving is performed can be achieved.

In addition, in the first aspect described above, for example, the processor of the information collection system may further request state data indicating whether or not the passenger is in a normal state in the vehicle, from the on-vehicle terminal which is the output source of the event sensor data or the request destination, and acquire the state data from the on-vehicle terminal from which the state data has been requested, and in the storage, the event sensor data acquired from the passenger sensor or the sensor data acquired from the passenger sensor which is the request destination may be stored in the second memory, only when the acquired state data indicates that the passenger is in a normal state.

If the passenger is not in the normal state in the vehicle, the reliability of the data detected by the passenger sensor is considered to be low. Therefore, in the present aspect, data acquired from the passenger sensor is stored in the second memory only when the state data indicates that the passenger is in the normal state. Therefore, according to the present aspect, the data detected by the passenger sensor can be stored only when the data has high reliability.

Embodiments

Hereinafter, embodiments of the present disclosure will be described with reference to the drawings. In the drawings, the same reference numerals are used for the same constituents, and detailed description will be omitted as appropriate.

First Embodiment

FIG. 1 is a block diagram schematically showing a configuration of an information collection system according to a first embodiment. An information collection system 10 shown in FIG. 1 includes a vehicle 20, a server device 30, a smartphone 50, and a smart watch 60. The vehicle 20, the smartphone 50 and the smart watch 60, and the server device 30 are configured to be able to communicate with each other via, for example, a network 40, such as the Internet. The vehicle 20 is, for example, a four-wheeled vehicle in the present embodiment. In the present embodiment, a driver and a passenger who rides with the driver are on the vehicle 20, the smartphone 50 is owned by the passenger, and the smart watch 60 is worn by the passenger.

The vehicle 20 includes a communication interface (IF) 100, a front camera 105F, a rear camera 105R, a left rear camera 110L, a right rear camera 110R, a left camera 115L, a right camera 115R, light detection and ranging (LIDAR) 120, a vehicle speed sensor 125, a drive recorder 128, and an electronic control unit (ECU) 160. The drive recorder 128 includes an acceleration sensor 130. The ECU 160 includes a memory 165, a central processing unit (CPU) 170, and a peripheral circuit (not shown).

The memory 165 is configured with, for example, a semiconductor memory or the like. The memory 165 includes, for example, a read only memory (ROM), a random access memory (RAM), and an electrically erasable programmable read only memory (EEPROM). For example, the ROM of the memory 165 stores a control program of the first embodiment for operating the CPU 170. The CPU 170 operates in accordance with the control program of the first embodiment stored in the memory 165 to function as a driving determiner 175, an identification information (ID) registration portion 180, and a communication controller 185.

The communication IF 100 is a communication circuit that is connected to the ECU 160 and performs communication according to control of the communication controller 185. The communication IF 100 generates a communication signal containing data to be transmitted, which is input from the ECU 160, according to a communication protocol used in the network 40, and transmits the generated communication signal to the server device 30 via the network 40. The communication IF 100 includes a communication interface circuit according to a predetermined standard.

The front camera 105F is attached to the center of a front surface of the vehicle 20 (for example, the center of an upper portion of the windshield) such that an optical axis of the front camera 105F is directed to the front of the vehicle 20. The rear camera 105R is attached to the center of the rear surface of the vehicle 20 (for example, in the vicinity of the rear number plate) so that an optical axis of the rear camera 105R is directed to the rear of the vehicle 20. The left rear camera 110L, the right rear camera 110R, the left camera 115L, and the right camera 115R respectively pick up an image of a range including the left rear side, the right rear side, the left side, and the right side of the vehicle 20.

The cameras 105F, 105R, 110L, 110R, 115L, and 115R each picks up an image of a fan-shaped imaging range centered on the optical axis at every predetermined time (for example, 1/60 seconds). The cameras 105F, 105R, 110L, 110R, 115L, and 115R each outputs the picked-up imaging data to the ECU 160 at every predetermined time (for example, 1/60 seconds).

The LIDAR 120 is attached to, for example, the roof of the vehicle 20. The LIDAR 120 emits a pulse of laser light and measures a time period that it takes to return to detect a distance to a reflector. The LIDAR 120 detects a three-dimensional shape of the periphery of the vehicle 20 by rotating an emission direction of the laser light in a horizontal direction and simultaneously swinging the laser light in a vertical direction at high speed.

The vehicle speed sensor 125 detects a speed of the vehicle 20. Note that the configuration may be such that the vehicle speed sensor 125 detects a rotational speed of wheels of the vehicle 20, and the CPU 170 calculates the speed of the vehicle 20 based on the detected rotational speed of the wheels.

The acceleration sensor 130 of the drive recorder 128 detects an acceleration of the vehicle 20. The drive recorder 128 stores imaging data output from the front camera 105F and the rear camera 105R in an internal memory (not shown) in a first-in first-out (FIFO) manner for a predetermined pre-storage time period Ta (for example 10 seconds). The drive recorder 128 stops the storage in the FIFO manner at a time point at which the acceleration of the vehicle 20 exceeds a predetermined acceleration threshold value Gthc (FIG. 2 described later), and storage of imaging data in the internal memory from a time point at which the storage in the FIFO manner is stopped to before the pre-storage time period Ta is maintained. Furthermore, the drive recorder 128 stores imaging data in the internal memory for a predetermined post-storage time period Tb (for example, 5 seconds) from a time point at which the storage in the FIFO manner is stopped. That is, in the internal memory of the drive recorder 128, the imaging data of the front camera 105F and the rear camera 105R during a storage time period (Ta+Tb) before and after the time point at which the storage in the FIFO manner is stopped is stored.

The driving determiner 175 of the CPU 170 determines whether or not an event trigger has occurred based on imaging data output from the cameras 105F, 105R, 110L, 110R, 115L, and 115R, distance data output from the LIDAR 120, speed data output from the vehicle speed sensor 125, and acceleration data output from the acceleration sensor 130. When determining that an event trigger has occurred, the driving determiner 175 determines that driving performed by the driver is dangerous driving. An event trigger is determined in advance and relates to dangerous driving. In the present embodiment, the drive recorder 128 corresponds to an example of the on-vehicle terminal, and the acceleration sensor 130 corresponds to an example of the on-vehicle sensor.

Figure 2:
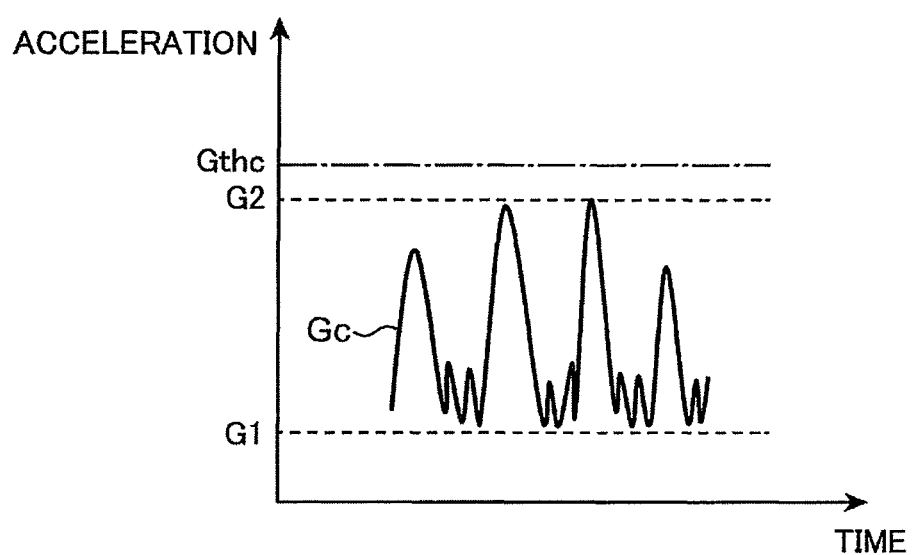
FIG. 2 is a diagram schematically showing an example of determination by a driving determiner.

FIG. 2 is a diagram schematically showing an example of determination by the driving determiner 175. The driving determiner 175 determines whether or not an event trigger, in which the magnitude of an absolute value of an acceleration of the vehicle 20 detected by the acceleration sensor 130 exceeds the predetermined acceleration threshold value Gthc, has occurred. When an event trigger, in which the magnitude of an absolute value of an acceleration of the vehicle 20 exceeds the acceleration threshold value Gthc, occurs (that is, when rapid acceleration or rapid deceleration is performed), the driving determiner 175 determines that dangerous driving is performed. In FIG. 2, an acceleration Ge of the vehicle 20 detected by the acceleration sensor 130 changes between a minimum acceleration G1 and a maximum acceleration G2. In the example of FIG. 2, the maximum acceleration G2 is equal to or less than the acceleration threshold value Gthc. Therefore, the driving determiner 175 does not determine that the driving by the driver is dangerous driving. Furthermore, the drive recorder 128 does not stop the storage in the FIFO manner.

Returning to FIG. 1, the driving determiner 175 stores imaging data output from the cameras 110L, 110R, 115L, and 115R, distance data output from the LIDAR 120, speed data output from the vehicle speed sensor 125, and acceleration data output from the acceleration sensor 130 in the memory 165 in the FIFO manner for a predetermined pre-storage time period T1 (for example, 10 seconds). The driving determiner 175 stops the storage in the FIFO manner at a time point at which an event trigger is determined to have occurred or at a time point at which data is requested by the server device 30 (Step S1225 in FIG. 8 described later), and maintains the storage of each piece of data in the memory 165 from a time point at which the storage in the FIFO manner is stopped to before the pre-storage time period T1. Furthermore, the driving determiner 175 stores each piece of data in the memory 165 for a predetermined post-storage time period T2 (for example, 5 seconds) from a time point at which the storage in the FIFO manner is stopped. That is, each piece of data in the storage time periods (T1+T2) before and after the time point at which the storage in the FIFO manner is stopped is stored in the memory 165.

The ID registration portion 180 registers, in the server device 30, unique vehicle identification information (vehicle ID) for identifying the vehicle 20, a unique driver ID for identifying a driver of the vehicle 20, and an on-vehicle terminal ID of an on-vehicle terminal (in the present embodiment, for example, the drive recorder 128) mounted on the vehicle 20. When, for example, the communication controller 185 first communicates with the server device 30, the ID registration portion 180 may register a vehicle ID, a driver ID, and an on-vehicle terminal ID in the server device 30. Alternatively, the ID registration portion 180 may register a vehicle ID, a driver ID, and an on-vehicle terminal ID in the server device 30 based on, for example, operation by an owner of the vehicle 20.

The communication controller 185 transmits to the server device 30 an acceleration (corresponding to an example of the event sensor data) of the vehicle 20 in the storage time period (T1+T2) before and after a time point at which the storage in the FIFO manner is stopped stored in an internal memory of the drive recorder 128 and the acceleration threshold value Gthc via the communication IF 100 in response to, for example, an event trigger in which the magnitude of an absolute value of the acceleration of the vehicle 20 detected by the acceleration sensor 130 of the drive recorder 128 exceeds the acceleration threshold value Gthc, together with the on-vehicle terminal ID identifying the drive recorder 128 and time data.

When data of the drive recorder 128 is requested (for example, Step S1225 in FIG. 8 described later) by the server device 30, the communication controller 185 transmits to the server device 30 the acceleration data (corresponding to an example of the sensor data) in the storage time period (T1+T2) before and after a time period at which the storage in the FIFO manner is stopped stored in the internal memory of the drive recorder 128 via the communication IF 100, together with the on-vehicle terminal ID identifying the drive recorder 128 and time data.

The smartphone 50 (corresponding to an example of the passenger terminal) includes a communication IF 300, a control circuit 305, and an acceleration sensor 360. The control circuit 305 includes a memory 310, a CPU 320, and a peripheral circuit (not shown). The memory 310 is configured with, for example, a semiconductor memory or the like. The memory 310 includes, for example, a ROM, a RAM, an EEPROM, and the like. For example, the ROM of the memory 310 stores an application program of the present embodiment for operating the CPU 320. The CPU 320 functions as an event determiner 330, an ID registration portion 335, and a communication controller 340 by operating according to the application program of the present embodiment stored in the memory 310.

The communication IF 300 is a communication circuit that is connected to the control circuit 305, and for communicating with the server device 30 under the control of the communication controller 340. The communication IF 300 may include a communication interface circuit according to the same standard as the communication IF 100. The acceleration sensor 360 (corresponding to an example of the passenger sensor) detects an acceleration of the smartphone 50. The acceleration sensor 360 outputs the detected acceleration to the control circuit 305.

The event determiner 330 of the CPU 320 determines, based on the acceleration detected by the acceleration sensor 360, whether or not a predetermined event trigger has occurred. The event trigger is a driving situation that is related to dangerous driving and is a cause to determine that dangerous driving is performed. For example, the event determiner 330 determines occurrence of an event trigger in which the magnitude of an absolute value of an acceleration of the smartphone 50 detected by the acceleration sensor 360 exceeds a predetermined acceleration threshold value Gthp (that is, the vehicle 20 on which the passenger carrying the smartphone 50 rides rapidly accelerates or rapidly decelerates).

Figure 3:
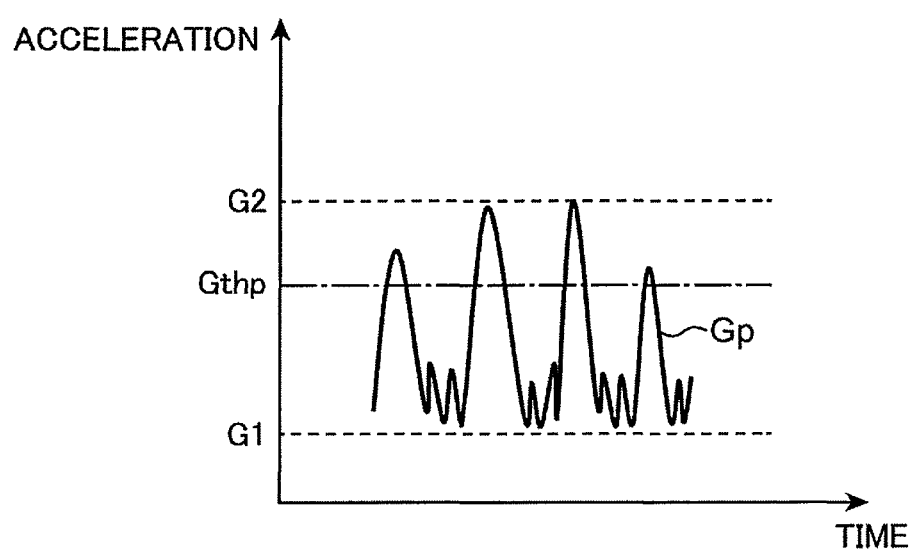
FIG. 3 is a diagram schematically showing an example of determination by an event determiner.

FIG. 3 is a diagram schematically showing an example of determination by the event determiner 330. In FIG. 3, an acceleration Gp of the smartphone 50 detected by the acceleration sensor 360 changes between the minimum acceleration G1 and the maximum acceleration G2 as in FIG. 2. In the example of FIG. 3, the maximum acceleration G2 exceeds the acceleration threshold value Gthp. For this reason, the event determiner 330 determines that an event trigger has occurred.

As shown in FIG. 2, the acceleration threshold value Gthc exceeds the maximum acceleration G2, and the acceleration threshold value Gthp is less than the maximum acceleration G2. That is, the acceleration threshold value Gthc and the acceleration threshold value Gthp are different values. Therefore, in the example of FIG. 2, the driving determiner 175 determines that no event trigger has occurred, and determines that driving by the driver is not dangerous driving. On the other hand, in the example of FIG. 3, the event determiner 330 determines that an event trigger has occurred.

Returning to FIG. 1, the event determiner 330 stores the acceleration data output from the acceleration sensor 360 in the memory 310 by FIFO for a predetermined pre-storage time period T3 (for example, 10 seconds). The event determiner 330 stops the storage in the FIFO manner at a time point at which an event trigger is determined to have occurred or at a time point at which data is requested by the server device 30 (Step S1225 in FIG. 8 described later), and maintains the storage of acceleration data in the memory 310 from a time point at which the storage in the FIFO manner is stopped to before the pre-storage time period T3. Furthermore, the event determiner 330 stores the acceleration data in the memory 310 for a predetermined post-storage time period T4 (for example, 5 seconds) from a time point at which the storage in the FIFO manner is stopped. That is, acceleration data in the storage time period (T3+T4) before and after the time point at which the storage in the FIFO manner is stopped is stored in the memory 310.

The ID registration portion 335 registers in the server device 30 a unique passenger ID for identifying a passenger who holds the smartphone 50 and a unique smartphone ID (corresponding to an example of the identification information of the passenger terminal) for identifying the smartphone 50. The passenger ID and the smartphone ID may be registered in the memory 310 when the smartphone 50 is purchased by a passenger.

When the application program of the present embodiment is stored in the memory 310, the ID registration portion 335 may automatically register the passenger ID and the smartphone ID in the server device 30. Alternatively, the ID registration portion 335 may register the passenger ID and the smartphone ID in the server device 30 based on, for example, operation by an owner of the smartphone 50.

When the event determiner 330 determines that an event trigger, in which the magnitude of an absolute value of an acceleration of the smartphone 50 detected by the acceleration sensor 360 exceeds the predetermined acceleration threshold value Gthp, has occurred, the communication controller 340 transmits to the server device 30 an acceleration (corresponding to an example of the event sensor data) of the smartphone 50 in the storage time period (T3+T4) before and after a time point at which the storage in the FIFO manner is stopped stored in the memory 310 and the acceleration threshold value Gthp via the communication IF 300 together with, for example, the smartphone ID (or the passenger ID) and time data, in response to the event trigger.

When data is requested (for example, Step S1225 in FIG. 8 described later) by the server device 30, the communication controller 340 transmits to the server device 30 the acceleration data (corresponding to an example of the sensor data) of the acceleration sensor 360 in the storage time period (T3+T4) before and after a time period at which the storage in the FIFO manner is stopped stored in the memory 310 via the communication IF 300 together with, for example, the smartphone ID (or the passenger ID) and time data.

The smart watch 60 (corresponding to an example of the passenger terminal) is a watch-type wearable computer. The smart watch 60 includes a communication IF 400, a control circuit 405, and a heart rate sensor 460. The control circuit 405 includes a memory 410, a CPU 420, and a peripheral circuit (not shown). The memory 410 is configured with, for example, a semiconductor memory or the like. The memory 410 includes, for example, a ROM, a RAM, an EEPROM, and the like. For example, the ROM of the memory 410 stores an application program of the present embodiment for operating the CPU 420. The CPU 420 functions as an event determiner 430, an ID registration portion 435, and a communication controller 440 by operating according to the application program of the present embodiment stored in the memory 410.

The communication IF 400 is a communication circuit that is connected to the control circuit 405, and for communicating with the server device 30 under the control of the communication controller 440. The communication IF 400 may include a communication interface circuit according to the same standard as the communication IF 100. The heart rate sensor 460 (corresponding to an example of the passenger sensor) detects heart rate data of a passenger wearing the smart watch 60. The heart rate sensor 460 outputs the detected heart rate data to the control circuit 405.

Figure 4:
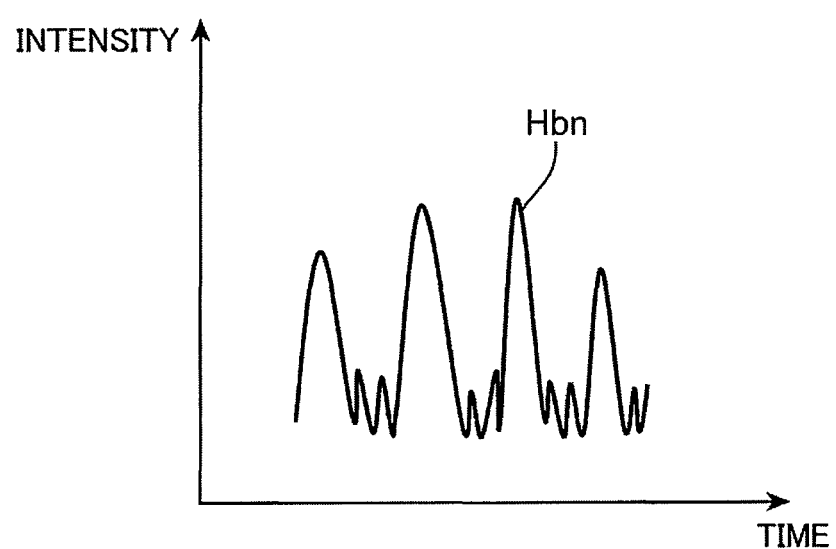
FIG. 4 is a diagram schematically showing an example of heart rate data detected by a heart rate sensor.
Figure 5:
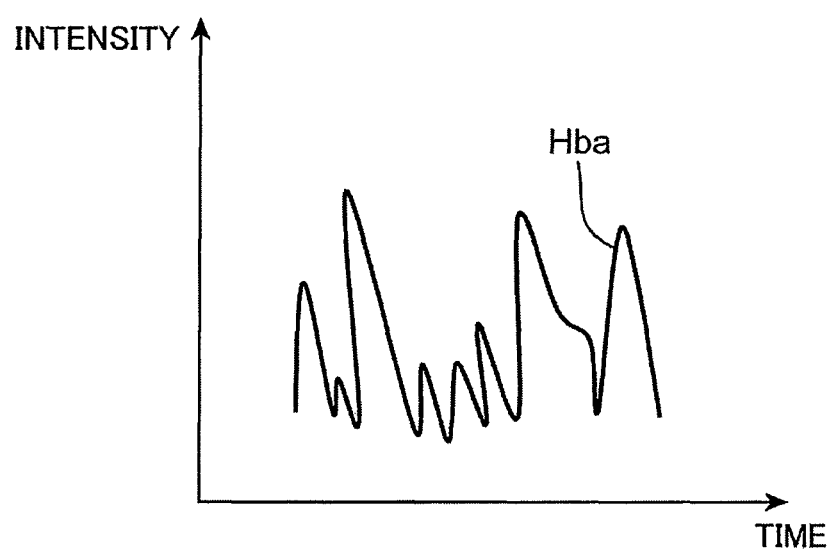
FIG. 5 is a diagram schematically showing an example of heart rate data detected by a heart rate sensor.

FIG. 4 and FIG. 5 are diagrams schematically showing an example of heart rate data detected by the heart rate sensor 460. In FIG. 4, heart rate data Hbn changes regularly in intensity, and represents heart rate data of a passenger in normal times. On the other hand, in FIG. 5, heart rate data Hba changes irregularly in intensity, and represents heart rate data of a passenger being upset. The heart rate data Hbn in normal times shown in FIG. 4 is detected by the heart rate sensor 460 when, for example, the passenger wears the smart watch 60 that has been taken off, and is stored in the memory 410. Alternatively, heart rate data detected by the heart rate sensor 460 at a predetermined time from the start of traveling of the vehicle 20 may be stored in the memory 410 as heart rate data Hbn in normal times.

Returning to FIG. 1, the event determiner 430 of the CPU 420 determines, based on the heart rate data detected by the heart rate sensor 460, whether or not a predetermined event trigger has occurred. The event determiner 430 calculates, for example, a cross-correlation between time data of the heart rate data detected by the heart rate sensor 460 and time data of the heart rate data Hbn (FIG. 4) stored in the memory 410. The event determiner 430 calculates a peak value of a correlation value from the obtained cross-correlation.

If the peak value of the correlation value is close to one, the event determiner 430 determines that the heart rate data detected by the heart rate sensor 460 is correlated to (that is, similar to) the heart rate data Hbn (FIG. 4) stored in the memory 410, and determines that no event trigger has occurred. On the other hand, if the peak value of the correlation value is not close to one, the event determiner 430 determines that the heart rate data detected by the heart rate sensor 460 is not correlated to (that is, not similar to) the heart rate data Hbn (FIG. 4) stored in the memory 410, and determines that an event trigger has occurred.

Whether or not the peak value of the correlation value is close to one is preferably determined based on whether or not the peak value of the correlation value is equal to or more than an appropriate correlation threshold value Cth (corresponding to an example of the heart rate threshold value) that is set in advance. For the correlation threshold value Cth, $0<Cth<1$ is established, and, for example, Cth=0.5. For example, when the heart rate data Hba as shown in FIG. 5 is detected by the heart rate sensor 460, the peak value of the correlation value becomes less than the correlation threshold value Cth, and the event determiner 430 determines that an event trigger has occurred.

The event determiner 430 stores the heart rate data detected by the heart rate sensor 460 in the memory 410 in the FIFO manner for a predetermined pre-storage time period T5 (for example, 10 seconds). The event determiner 430 stops the storage in the FIFO manner at a time point at which an event trigger is determined to have occurred or at a time point at which data is requested by the server device 30 (Step S1225 in FIG. 8 described later), and maintains the storage of heart rate data in the memory 410 from a time point at which the storage in the FIFO manner is stopped to before the pre-storage time period T5. Furthermore, the event determiner 430 stores the heart rate data in the memory 410 for a predetermined post-storage time period T6 (for example, 5 seconds) from a time point at which the storage in the FIFO manner is stopped. That is, heart rate data in the storage time period (T5+T6) before and after the time point at which the storage in the FIFO manner is stopped is stored in the memory 410.

The ID registration portion 435 registers in the server device 30 a unique passenger ID for identifying a passenger who holds the smart watch 60 and a unique smart watch ID (corresponding to an example of the identification information of the passenger terminal) for identifying the smart watch 60. The passenger ID and the smart watch ID may be registered in the memory 410 when the smart watch 60 is purchased by a passenger.

When the application program of the present embodiment is stored in the memory 410, the ID registration portion 435 may automatically register the passenger ID and the smart watch ID in the server device 30. Alternatively, the ID registration portion 435 may register the passenger ID and the smart watch ID in the server device 30 based on, for example, operation by a wearer of the smart watch 60.

When the event determiner 430 determines that an event trigger, in which the peak value of the correlation value is less than the correlation threshold value Cth, has occurred, the communication controller 440 transmits, in response to the event trigger, to the server device 30 heart rate data (corresponding to an example of the event sensor data) of the heart rate sensor 460 in the storage time period (T5+T6) before and after a time point at which the storage in the FIFO manner is stopped stored in the memory 410 and the heart rate data Hbn (FIG. 4) stored in the memory 410 via the communication IF 400 together with, for example, the smart watch ID (or the passenger ID) and time data.

When data is requested (for example, Step S1225 in FIG. 8 described later) by the server device 30, the communication controller 440 transmits to the server device 30 the heart rate data (corresponding to an example of the sensor data) of the heart rate sensor 460 in the storage time period (T5+T6) before and after a time period at which the storage in the FIFO manner is stopped stored in the memory 410 via the communication IF 400 together with, for example, the smart watch ID (or the passenger ID) and time data.

The server device 30 includes a communication IF 200, a control circuit 205, and a storage device 260. The control circuit 205 includes a memory 210, a CPU 220, and a peripheral circuit (not shown). The memory 210 is configured with, for example, a semiconductor memory or the like. The memory 210 includes, for example, a ROM, a RAM, an EEPROM, and the like. For example, the ROM of the memory 210 stores the control program of the first embodiment for operating the CPU 220. The CPU 220 functions as a driving data acquisition portion 230 and a communication controller 235 by operating according to the control program of the first embodiment stored in the memory 210.

The storage device 260 is configured with, for example, a hard disk, a semiconductor non-volatile memory, or the like. The storage device 260 includes a passenger information storage 265 and a dangerous driving data storage 270. The passenger information storage 265 (corresponding to an example of the first memory) stores a vehicle ID registered by the ID registration portion 180, a driver ID, an on-vehicle terminal ID, a passenger ID registered by the ID registration portion 335, a smartphone ID, a passenger ID registered by the ID registration portion 435, and a smart watch ID in association with each other. A stored content of the dangerous driving data storage 270 (corresponding to an example of the second memory) will be described later.

The communication IF 200 is a communication circuit that is connected to the control circuit 205 and performs communication according to control of the communication controller 235. The communication IF 200 receives, via the network 40, a communication signal transmitted from the communication IF 100 of the vehicle 20, a communication signal transmitted from the communication IF 300 of the smartphone 50, and a communication signal transmitted from the communication IF 400 of the smart watch 60. The communication IF 200 may include, for example, a communication interface circuit according to the same standard as the communication IF 100. The communication controller 235 of the CPU 220 controls communication with the vehicle 20, the smartphone 50, and the smart watch 60 via the communication IF 200.

An acceleration (corresponding to an example of the event sensor data) of the acceleration sensor 130 in the storage time period (T1+T2) before and after a time point at which the storage in the FIFO manner is stopped and the acceleration threshold value Gthc are transmitted from the vehicle 20 in response to, for example, an event trigger in which the magnitude of an absolute value of the acceleration of the acceleration sensor 130 exceeds the acceleration threshold value Gthc, together with, for example, the on-vehicle terminal ID (corresponding to an example of the identification information) for identifying the drive recorder 128 and time data. Then, the driving data acquisition portion 230 (corresponding to an example of the first acquisition portion) receives the transmitted data via the communication controller 235, and stores the received data in the memory 210.

The driving data acquisition portion 230 (corresponding to an example of the first identification portion) identifies the smartphone 50 and the smart watch 60 associated with the on-vehicle terminal ID with reference to the passenger information storage 265. That is, the driving data acquisition portion 230 determines whether or not a device capable of detecting a driving state, which is associated with the on-vehicle terminal ID, is registered in the passenger information storage 265, and if registered, the smartphone 50 and the smart watch 60 corresponding to an ID (in the present embodiment, the smartphone ID and the smart watch ID) associated with the on-vehicle terminal ID are identified.

The driving data acquisition portion 230 (corresponding to an example of the requesting portion) requests acceleration data of the acceleration sensor 360 synchronized with an acceleration of the acceleration sensor 130 (that is, in the same time zone as the acceleration of the acceleration sensor 130) from the identified smartphone 50. The driving data acquisition portion 230 (corresponding to an example of the second acquisition portion) receives acceleration data (corresponding to an example of the sensor data) of the acceleration sensor 360 and the like in the storage time period (T3+T4) before and after a time point at which the storage in the FIFO manner is stopped transmitted from the smartphone 50 which is a request destination via the communication controller 235, and stores the data and the like in the memory 210.

The driving data acquisition portion 230 (corresponding to an example of the storage controller) stores an acceleration of the acceleration sensor 130 and the acceleration threshold value Gthc, an acceleration data of the acceleration sensor 360 and the acceleration threshold value Gthp, time data of these, the on-vehicle terminal ID, and the smartphone ID in the dangerous driving data storage 270 by associating them with each other.

The driving data acquisition portion 230 (corresponding to an example of the requesting portion) requests heart rate data of the heart rate sensor 460 synchronized with an acceleration of the acceleration sensor 130 (that is, in the same time zone as the acceleration of the acceleration sensor 130) from the identified smart watch 60. The driving data acquisition portion 230 (corresponding to an example of the second acquisition portion) receives heart rate data (corresponding to an example of the sensor data) of the heart rate sensor 460 and the like in the storage time period (T5+T6) before and after a time point at which the storage in the FIFO manner is stopped transmitted from the smart watch 60 via the communication controller 235, and stores the data and the like in the memory 210.

The driving data acquisition portion 230 (corresponding to an example of the storage controller) stores an acceleration of the acceleration sensor 130 and the acceleration threshold value Gthc, heart rate data of the heart rate sensor 460 and the heart rate data Hbn in normal times, time data of these, the on-vehicle terminal ID, and the smart watch ID in the dangerous driving data storage 270 by associating them with each other.

An acceleration (corresponding to an example of the event sensor data) of the smartphone 50 in the storage time period (T3+T4) before and after a time point at which the storage in the FIFO manner is stopped and the acceleration threshold value Gthp are transmitted from the smartphone 50 in response to, for example, an event trigger in which the magnitude of an absolute value of the acceleration of the smartphone 50 detected by the acceleration sensor 360 exceeds the acceleration threshold value Gthp, together with, for example, the smartphone ID (or the passenger ID, corresponding to an example of the identification information) and time data. Then, the driving data acquisition portion 230 (corresponding to an example of the first acquisition portion) receives the transmitted data via the communication controller 235, and stores the received data in the memory 210.

The driving data acquisition portion 230 (corresponding to an example of the second identification portion) identifies the drive recorder 128 associated with the smartphone ID with reference to the passenger information storage 265. That is, the driving data acquisition portion 230 determines whether or not a device capable of detecting a driving state, which is associated with the smartphone ID, is registered in the passenger information storage 265, and if registered, the drive recorder 128 corresponding to an ID (in the present embodiment, the on-vehicle terminal ID identifying the drive recorder 128) associated with the smartphone ID is identified.

The driving data acquisition portion 230 (corresponding to an example of the requesting portion) requests sensor data of the drive recorder 128 synchronized with the acceleration of the smartphone 50 (that is, in the same time zone) from the identified drive recorder 128. The driving data acquisition portion 230 (corresponding to an example of the second acquisition portion) receives sensor data (that is, acceleration data of the acceleration sensor 130) in the storage time period (T1+T2) before and after a time point at which the storage in the FIFO manner is stopped transmitted from the drive recorder 128 which is a request destination, the on-vehicle terminal ID, and time data via the communication controller 235, and stores them in the memory 210.

The driving data acquisition portion 230 (corresponding to an example of the storage controller) stores acceleration data of the acceleration sensor 360 and the acceleration threshold value Gthp, acceleration data of the acceleration sensor 130 of the drive recorder 128, time data of these, the on-vehicle terminal ID, and the smartphone ID in the dangerous driving data storage 270 by associating them with each other.

In response to an event trigger, in which the peak value of the correlation value between heart rate data detected by the heart rate sensor 460 and the heart rate data Hbn (FIG. 4) stored in the memory 410 is less than the correlation threshold value Cth, the heart rate data (corresponding to an example of the event sensor data) of the heart rate sensor 460 in the storage time period (T5+T6) before and after a time point at which the storage in the FIFO manner is stopped and the heart rate data Hbn (FIG. 4) are transmitted from the smart watch 60 together with, for example, the smart watch ID (or the passenger ID, corresponding to an example of the identification information) and time data. Then, the driving data acquisition portion 230 (corresponding to an example of the first acquisition portion) receives the transmitted data via the communication controller 235, and stores the received data in the memory 210.

The driving data acquisition portion 230 (corresponding to an example of the second identification portion) identifies the drive recorder 128 associated with the smart watch ID with reference to the passenger information storage 265. That is, the driving data acquisition portion 230 determines whether or not a device capable of detecting a driving state, which is associated with the smart watch ID, is registered in the passenger information storage 265, and if registered, the drive recorder 128 corresponding to an ID (in the present embodiment, the on-vehicle terminal ID identifying the drive recorder 128) associated with the smart watch ID is identified.

The driving data acquisition portion 230 (corresponding to an example of the requesting portion) requests sensor data of the acceleration sensor 130 synchronized with the heart rate data of the heart rate sensor 460 (that is, in the same time zone) from the identified drive recorder 128. The driving data acquisition portion 230 (corresponding to an example of the second acquisition portion) receives sensor data (that is, acceleration data of the acceleration sensor 130) in the storage time period (T1+T2) before and after a time point at which the storage in the FIFO manner is stopped transmitted from the drive recorder 128 which is a request destination, the on-vehicle terminal ID, and time data via the communication controller 235, and stores them in the memory 210.

The driving data acquisition portion 230 (corresponding to an example of the storage controller) stores heart rate data of the heart rate sensor 460 and the heart rate data Hbn in normal times, acceleration data of the acceleration sensor 130 of the drive recorder 128, time data of these, the on-vehicle terminal ID, and the smart watch ID in the dangerous driving data storage 270 by associating them with each other.

Figure 6:
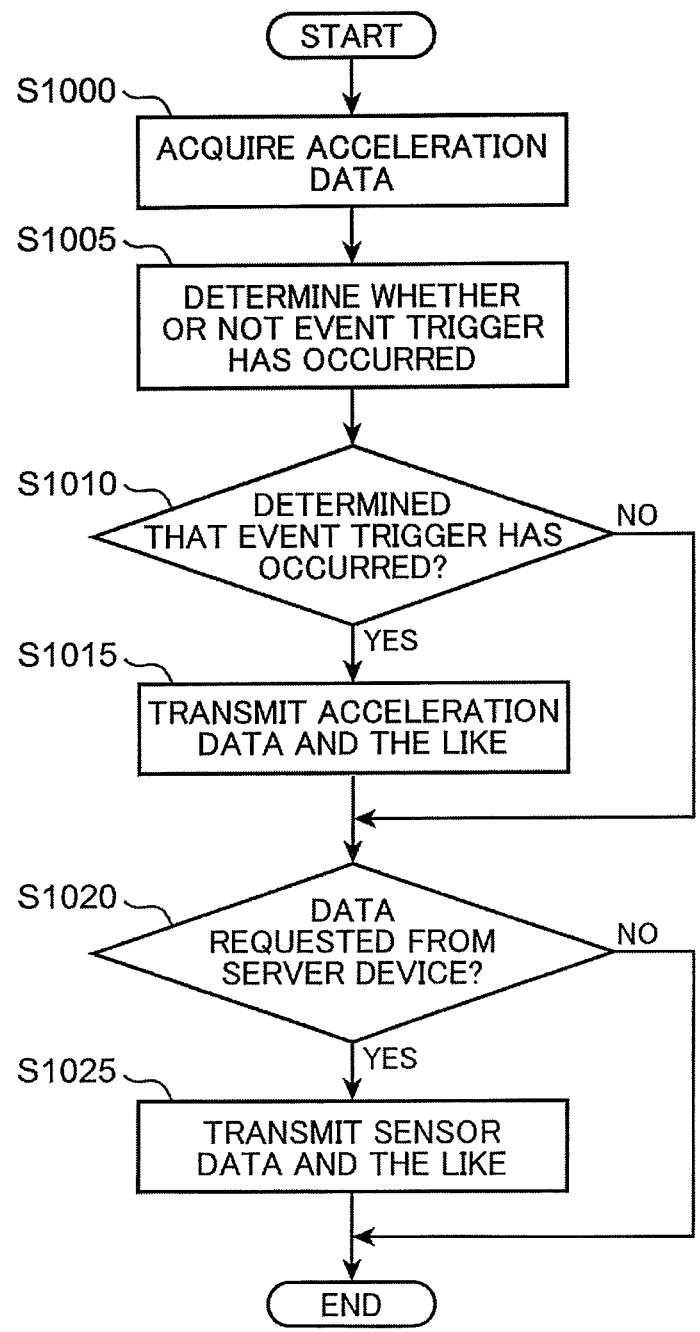
FIG. 6 is a flowchart schematically showing operation of a vehicle of the first embodiment.

FIG. 6 is a flowchart schematically showing operation in the vehicle 20 of the information collection system 10 according to the first embodiment. The operation of FIG. 6 is repeatedly executed at predetermined time intervals (for example, 10 msec).

In Step S1000, the driving determiner 175 acquires acceleration data of the acceleration sensor 130 of the drive recorder 128. In Step S1005, the driving determiner 175 determines, based on the acquired acceleration data, whether or not an event trigger has occurred (that is, whether or not dangerous driving is performed). Specifically, the driving determiner 175 determines whether or not the acceleration data exceeds the acceleration threshold value Gthc. In Step S1010, the communication controller 185 determines whether or not occurrence of an event trigger has been determined by the driving determiner 175. If occurrence of an event trigger is determined by the driving determiner 175 (YES in Step S1010), the processing proceeds to Step S1015. On the other hand, if occurrence of an event trigger is not determined by the driving determiner 175 (NO in Step S1010), the processing proceeds to Step S1020. In Step S1015, the communication controller 185 transmits the acceleration data and the like of the acceleration sensor 130 to the server device 30.

In Step S1020, the communication controller 185 determines whether or not data has been requested by the server device 30. If data is requested by the server device 30 (YES in Step S1020), the processing proceeds to Step S1025. On the other hand, if no data is requested by the server device 30 (NO in Step S1020), the operation of FIG. 6 ends. In Step S1025, the communication controller 185 transmits sensor data and the like to the server device 30, and the operation of FIG. 6 ends.

Figure 7:
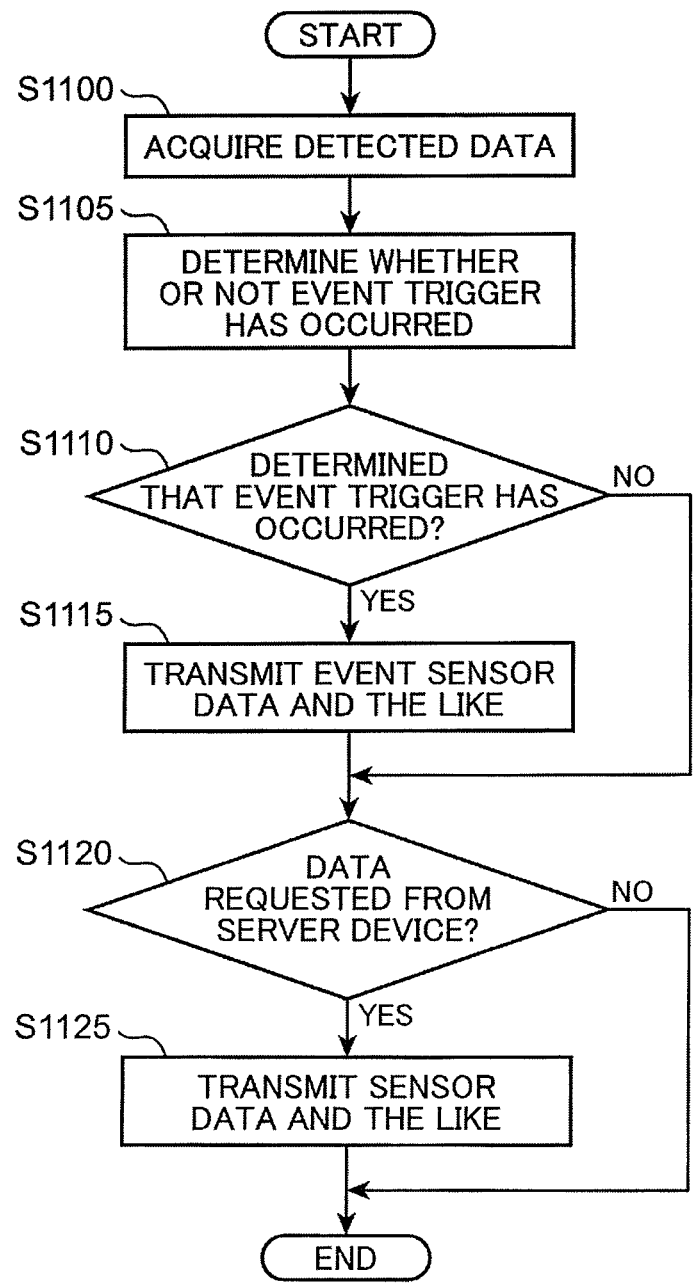
FIG. 7 is a flowchart schematically showing operation of a smartphone or a smart watch of the first embodiment.

FIG. 7 is a flowchart schematically showing the operation of the smartphone 50 or the smart watch 60 of the information collection system 10 according to the first embodiment. The operation of FIG. 7 is repeatedly executed at predetermined time intervals (for example, 10 msec).

First, operation of the smartphone 50 will be described. In Step S1100, the event determiner 330 acquires acceleration data of the acceleration sensor 360 as detection data. In Step S1105, the event determiner 330 determines whether or not an event trigger has occurred based on the acquired acceleration data. In Step S1110, the communication controller 340 determines whether or not the event determiner 330 determines that an event trigger has occurred. For example, if the magnitude of an absolute value of the acceleration data of the acceleration sensor 360 exceeds the acceleration threshold value Gthp, an event trigger is determined to have occurred.

If the event determiner 330 determines that an event trigger has occurred (YES in Step S1110), the processing proceeds to Step S1115. On the other hand, if the event determiner 330 does not determine that an event trigger has occurred (NO in Step S1110), the processing proceeds to Step S1120. In Step S1115, the communication controller 340 transmits event sensor data (acceleration data of the acceleration sensor 360) and the like to the server device 30.

In Step S1120, the communication controller 340 determines whether or not data has been requested by the server device 30. If data is requested by the server device 30 (YES in Step S1120), the processing proceeds to Step S1125. On the other hand, if no data is requested by the server device 30 (NO in Step S1120), the operation of FIG. 7 ends. In Step S1125, the communication controller 185 transmits sensor data (acceleration data of the acceleration sensor 360) and the like to the server device 30, and the operation of FIG. 7 ends.

Next, operation of the smart watch 60 will be described. In Step S1100, the event determiner 430 acquires heart rate data of the heart rate sensor 460 as detection data. In Step S1105, the event determiner 430 determines whether or not an event trigger has occurred based on the acquired heart rate data. In Step S1110, the communication controller 440 determines whether or not the event determiner 430 determines that an event trigger has occurred. For example, if a peak value of a correlation value between the heart rate data detected by the heart rate sensor 460 and the heart rate data Hbn (FIG. 4) stored in the memory 410 is less than the correlation threshold value Cth, an event trigger is determined to have occurred.

If the event determiner 430 determines that an event trigger has occurred (YES in Step S1110), the processing proceeds to Step S1115. On the other hand, if the event determiner 430 does not determine that an event trigger has occurred (NO in Step S1110), the processing proceeds to Step S1120. In Step S1115, the communication controller 440 transmits event sensor data (heart rate data of the heart rate sensor 460) and the like to the server device 30.

In Step S1120, the communication controller 440 determines whether or not data has been requested by the server device 30. If data is requested by the server device 30 (YES in Step S1120), the processing proceeds to Step S1125. On the other hand, if no data is requested by the server device 30 (NO in Step S1120), the operation of FIG. 7 ends. In Step S1125, the communication controller 185 transmits sensor data (heart rate data of the heart rate sensor 460) and the like to the server device 30, and the operation of FIG. 7 ends.

Figure 8:
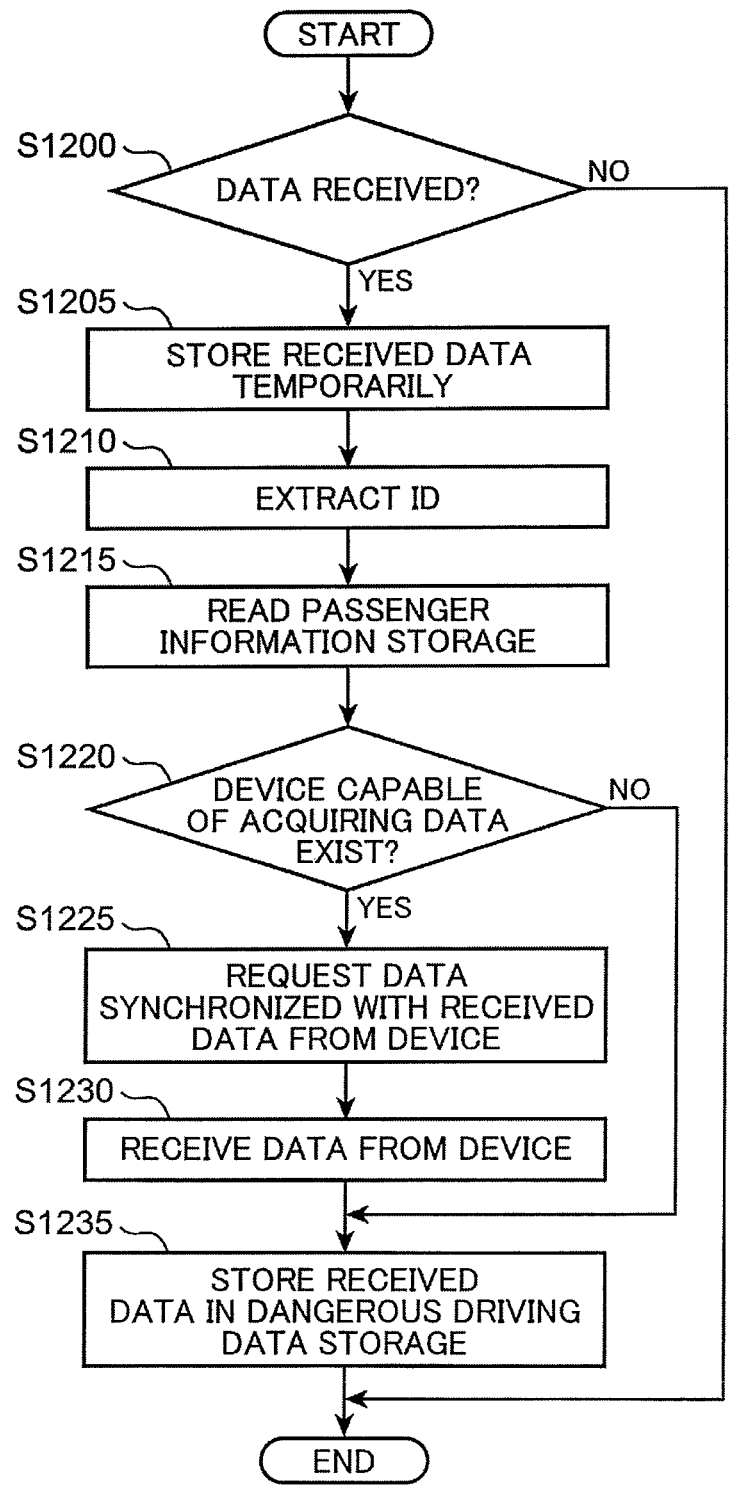
FIG. 8 is a flowchart schematically showing operation of a server device of the first embodiment.

FIG. 8 is a flowchart schematically showing operation of the server device 30 of the information collection system 10 according to the first embodiment. The operation of FIG. 8 is repeatedly executed at predetermined time intervals (for example, 10 msec).

In Step S1200, the driving data acquisition portion 230 determines whether or not the communication controller 235 has received data from the vehicle 20, the smartphone 50, or the smart watch 60. If data is received (YES in Step S1200), the processing proceeds to Step S1205. On the other hand, if no data is received (NO in Step S1200), the operation of FIG. 8 ends.

In Step S1205, the driving data acquisition portion 230 temporarily stores the received data in the memory 210. In Step S1210, the driving data acquisition portion 230 extracts identification information (ID) from the received data. In the present embodiment, this ID is the on-vehicle terminal ID identifying the drive recorder 128, the smartphone ID identifying the smartphone 50, or the smart watch ID identifying the smart watch 60.

In Step S1215, the driving data acquisition portion 230 reads the passenger information storage 265. In Step S1220, based on information registered in the passenger information storage 265, the driving data acquisition portion 230 determines whether or not there is a device capable of acquiring data. If there is a device capable of acquiring data (YES in Step S1220), the processing proceeds to Step S1225. On the other hand, if no device capable of acquiring data exists (NO in Step S1220), the processing proceeds to Step S1235.

For example, if the ID extracted in Step S1210 is the on-vehicle terminal ID, the driving data acquisition portion 230 determines whether or not the smartphone ID or the smart watch ID, associated with the extracted on-vehicle terminal ID, is registered in the passenger information storage 265 (Step S1220). If the smartphone ID or the smart watch ID is registered in the passenger information storage 265, a device capable of acquiring data is determined to exist (YES in Step S1220).

For example, if the ID extracted in Step S1210 is the smartphone ID or the smart watch ID, the driving data acquisition portion 230 determines whether or not the on-vehicle terminal ID, associated with the extracted smartphone ID or smart watch ID, is registered in the passenger information storage 265 (Step S1220). If the on-vehicle terminal ID is registered in the passenger information storage 265, a device capable of acquiring data is determined to exist (YES in Step S1220).

In Step S1225, the driving data acquisition portion 230 identifies a device associated with the extracted ID, and requests data synchronized with the received data from the identified device. For example, if the ID extracted in Step S1210 is the smartphone ID or smart watch ID, and the on-vehicle terminal ID registered in the passenger information storage 265 in association with the smartphone ID or smart watch ID is an ID that identifies the drive recorder 128, the driving data acquisition portion 230 identifies the drive recorder 128, and requests sensor data of the same time zone as the received data from the identified drive recorder 128.

For example, if the ID extracted in Step S1210 is the on-vehicle terminal ID, and the ID registered in the passenger information storage 265 in association with the on-vehicle terminal ID is the smartphone ID identifying the smartphone 50, the driving data acquisition portion 230 identifies the smartphone 50, and requests acceleration data of the acceleration sensor 360 in the same time zone as the received data from the identified smartphone 50.

Furthermore, for example, if the ID extracted in Step S1210 is the on-vehicle terminal ID, and the ID registered in the passenger information storage 265 in association with the on-vehicle terminal ID is the smart watch ID identifying the smart watch 60, the driving data acquisition portion 230 identifies the smart watch 60, and requests heart rate data of the heart rate sensor 460 in the same time zone as the received data from the identified smart watch 60.

In Step S1230, the driving data acquisition portion 230 receives the requested data from the device which is the request destination together with the ID via the communication controller 235. In Step S1235, the driving data acquisition portion 230 stores the received data in the dangerous driving data storage 270 in association with the ID. In Step S1235, when NO in Step S1220, the driving data acquisition portion 230 stores the received data temporarily stored in the memory 210 in Step S1205 in the dangerous driving data storage 270. Furthermore, in Step S1235, when YES in Step S1220, the driving data acquisition portion 230 stores the data received in Step S1230 in the dangerous driving data storage 270 in addition to the received data temporarily stored in the memory 210 in Step S1205. After Step S1235, the operation of FIG. 8 ends.

As described above, according to the first embodiment, when the acceleration data of the acceleration sensor 130 of the drive recorder 128 is transmitted to the server device 30 together with the on-vehicle terminal ID, the driving data acquisition portion 230 of the server device 30 identifies the smartphone 50 by the smartphone ID associated with the on-vehicle terminal ID. The driving data acquisition portion 230 acquires acceleration data of the acceleration sensor 360 from the identified smartphone 50, and stores the acceleration data of the acceleration sensor 130 of the drive recorder 128 and the acceleration data of the acceleration sensor 360 in the dangerous driving data storage 270. Therefore, dangerous driving information can be collected not only from the drive recorder 128 but also from the smartphone 50 owned by a passenger.

Furthermore, according to the first embodiment, the acceleration data of the acceleration sensor 360 is transmitted from the smartphone 50 to the server device 30 together with the smartphone ID in response to an event trigger, in which the magnitude of an absolute value of the acceleration data of the acceleration sensor 360 in the smartphone 50 exceeds the acceleration threshold value Gthp. Then, the driving data acquisition portion 230 identifies the drive recorder 128 by the on-vehicle terminal ID associated with the smartphone ID, acquires sensor data of the acceleration sensor 130 of the identified drive recorder 128, and stores the sensor data of the acceleration sensor 130 of the drive recorder 128 and the acceleration data of the acceleration sensor 360 in the dangerous driving data storage 270.

For example, as shown in FIG. 2, in a case where the acceleration Gc of the vehicle 20 by the acceleration sensor 130 of the drive recorder 128 is equal to or less than the acceleration threshold value Gthc, the driving determiner 175 of the vehicle 20 does not determine that an event trigger has occurred. Accordingly, acceleration data is not output from the vehicle 20 (drive recorder 128). However, even in this case, as shown in FIG. 3, in a case where the acceleration Gp of the smartphone 50 by the acceleration sensor 360 exceeds the acceleration threshold value Gthp, sensor data including acceleration data of the acceleration sensor 130 of the drive recorder 128 is stored in the dangerous driving data storage 270. Therefore, it is possible to achieve improvement of determination accuracy as to whether or not dangerous driving is performed.

Further, according to the first embodiment, in response to an event trigger in which a peak value of a correlation value between the heart rate data of the heart rate sensor 460 in the smart watch 60 and the heart rate data Hbn (FIG. 4) in normal times is less than the correlation threshold value Cth, the heart rate data from the smart watch 60 is transmitted to the server device 30 together with the smart watch ID. Then, the driving data acquisition portion 230 identifies the drive recorder 128 by the on-vehicle terminal ID associated with the smart watch ID, acquires sensor data of the acceleration sensor 130 of the identified drive recorder 128, and stores the heart rate data of the heart rate sensor 460 and the sensor data of the acceleration sensor 130 of the drive recorder 128 in the dangerous driving data storage 270.

For example, when the vehicle 20 passes near a pedestrian without decelerating, it can be considered that the passenger feels dangerous and the heart rate data Hba becomes irregular as shown in FIG. 5. In this case, since the driver does not operate a brake pedal, and there is no change in acceleration, the driving determiner 175 does not determine that an event trigger has occurred. However, even in this case, in a case where the passenger feels dangerous, the sensor data of the acceleration sensor 130 of the drive recorder 128 is stored in the dangerous driving data storage 270. Therefore, improvement in the determination accuracy as to whether or not dangerous driving is performed.

Further, as described above, in a case where the driving determiner 175 of the vehicle 20 does not determine that an event trigger has occurred, and the event determiner 430 of the smart watch 60 determines that an event trigger has occurred, it means that the passenger feels dangerous or uncomfortable even if the driver judges that there is no dangerous driving. In a case where the vehicle 20 is a taxi or the like that provides a passenger service to a passenger, driving that causes the passenger to feel dangerous or uncomfortable is not preferable. Therefore, the dangerous driving information stored in the dangerous driving data storage 270 can be used as data for improving the customer satisfaction in a taxi company. For example, the dangerous driving information can be used to correct a threshold value for determining occurrence of an event trigger, in such a manner as reducing the acceleration threshold value Gthc set in the driving determiner 175 or the drive recorder 128.

In the prior art described in the above-mentioned JP-A-2017-182490, only data of an on-vehicle device is left when an accident occurs, as described above. In contrast, according to the first embodiment, in a case where an accident occurs immediately after the driving determiner 175 of the vehicle 20 determines that an event trigger has occurred, heart rate data during the post-storage time period T6 is stored in the dangerous driving data storage 270 of the server device 30. Therefore, urgency of treatment for the passenger can be determined based on the heart rate data. Further, since the heart rate data is collectively stored in the server device 30, the heart rate data can be easily provided from the server device 30 to a hospital or the like that treats the passenger.

In general, there is little circumstantial evidence relating to a passenger required for a damage report when an insurance payment is made for an accident that occurs. However, according to the first embodiment, evidence necessary for insurance payment can be supplemented by using acceleration data or heart rate data of the passenger. For example, if the passenger has a fracture, it is necessary to hear the circumstances about a reason for the fracture at present. With respect to this point, according to the first embodiment, acceleration data of the smartphone 50 owned by the passenger is stored in the server device 30. For this reason, it is possible to shorten the time for the police or an insurance company to conduct an interview with the passenger.

Further, according to the first embodiment, there is an advantage that not only data directly related to the vehicle 20, such as speed or acceleration, but also data of different viewpoints, such as heart rate data of a passenger, can be stored.

Second Embodiment

Figure 9:
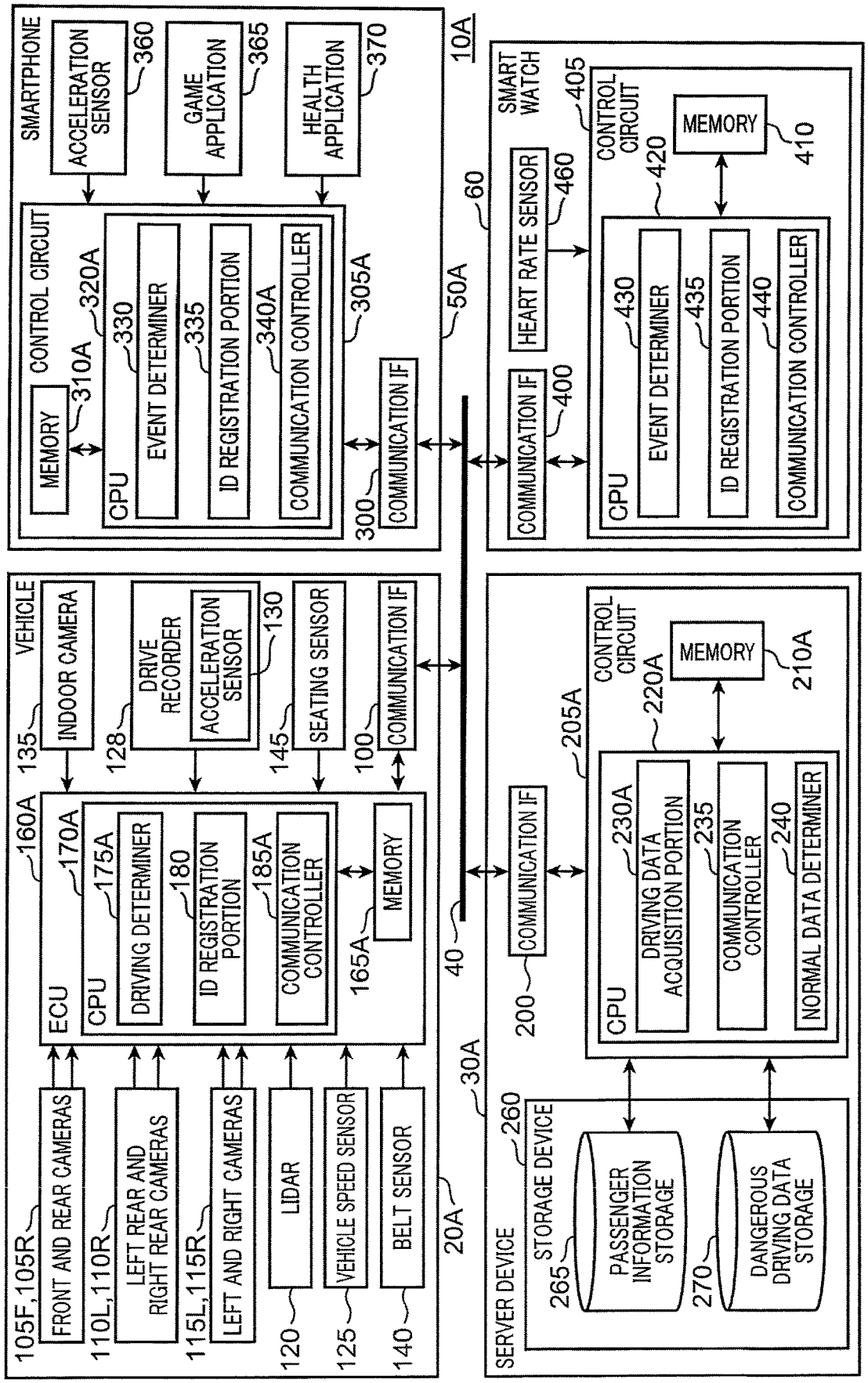
FIG. 9 is a block diagram schematically showing a configuration of an information collection system according to a second embodiment.

FIG. 9 is a block diagram schematically showing a configuration of the information collection system according to a second embodiment. An information collection system 10A shown in FIG. 9 includes a vehicle 20A, a server device 30A, a smartphone 50A, and the smart watch 60. The vehicle 20A, the smartphone 50A and the smart watch 60, and the server device 30A are configured to be able to communicate with each other via, for example, the network 40 such as the Internet. The vehicle 20A is, for example, a four-wheeled vehicle in the present embodiment. In the present embodiment, a driver and a passenger who rides with the driver are on the vehicle 20A, the smartphone 50A is owned by the passenger, and the smart watch 60 is worn by the passenger.

The vehicle 20A includes the communication IF 100, the front camera 105F, the rear camera 105R, the left rear camera 110L, the right rear camera 110R, the left camera 115L, the right camera 115S, the LIDAR 120, the vehicle speed sensor 125, the drive recorder 128, the ECU 160, an indoor camera 135, a belt sensor 140, and a seating sensor 145. The drive recorder 128 includes the acceleration sensor 130. The ECU 160A includes a memory 165A, a CPU 170A, and a peripheral circuit (not shown).

The indoor camera 135 is attached in front of a passenger seat on an indoor ceiling of the vehicle 20A, such that an optical axis of the indoor camera 135 is directed to the rear of the inside and a passenger seated in the passenger seat falls within an imaging range. The belt sensor 140 detects whether or not a seat belt of a passenger seat is worn. The seating sensor 145 detects whether or not the passenger is seated in the passenger seat.

The memory 165A is configured with, for example, a semiconductor memory or the like. The memory 165A includes, for example, a ROM, a RAM, an EEPROM, and the like. For example, the ROM of the memory 165A stores a control program of the second embodiment for operating the CPU 170A. The CPU 170A functions as a driving determiner 175A, the ID registration portion 180, and a communication controller 185A by operating according to the control program of the second embodiment stored in the memory 165A.

In addition to the function of the driving determiner 175 of the first embodiment, the driving determiner 175A also stores state data, such as imaging data by the indoor camera 135, detection data of the belt sensor 140, detection data of the seating sensor 145, and the like in the memory 165A by FIFO for a pre-storage time period T7 (for example, 10 seconds). The driving determiner 175A stops the storage in the FIFO manner at a time point at which an event trigger is determined to have occurred or at a time point at which data is requested by the server device 30 (Step S1300 in FIG. 11 described later), and maintains the storage of each piece of state data in the memory 165A from a time point at which the storage in the FIFO manner is stopped to before the pre-storage time period T7. Furthermore, the driving determiner 175A stores each piece of state data in the memory 165A for a predetermined post-storage time period T8 (for example, 5 seconds) from a time point at which the storage in the FIFO manner is stopped. That is, each piece of state data in the storage time periods (T7+T8) before and after the time point at which the storage in the FIFO manner is stopped is stored in the memory 165A.

In addition to the function of the communication controller 185 of the first embodiment, the communication controller 185A transmits to the server device 30 state data in the storage time period (T7+T8) before and after the time point at which the storage in the FIFO manner is stopped stored in the memory 165A, such as imaging data by the indoor camera 135, detection data of the belt sensor 140, detection data of the seating sensor 145, and the like via the communication. IF 100 together with, for example, the vehicle ID and time data, when the state data is requested (for example, Step S1300 in FIG. 11 described later) by the server device 30A.

The smartphone 50A includes the communication IF 300, a control circuit 305A, and the acceleration sensor 360. Further, in the smartphone 50A, a game application 365 that enables execution of a computer game and a health application 370 that enables measurement of a heart rate or a blood pressure are installed.

The control circuit 305A includes a memory 310A, a CPU 320A, and a peripheral circuit (not shown). The memory 310A is configured with, for example, a semiconductor memory or the like. The memory 310A includes, for example, a ROM, a RAM, an EEPROM, and the like. For example, the ROM of the memory 310A stores an application program of the present embodiment that operates the CPU 320A. The CPU 320A functions as the event determiner 330, the ID registration portion 335, and a communication controller 340A by operating according to the application program of the present embodiment stored in the memory 310A.

In addition to the functions of the communication controller 340 of the first embodiment, the communication controller 340A has a function of transmitting, to the server device 30A, information as to whether or not the game application 365 is running, information as to whether or not the health application 370 is running, and information as to whether or not a call function or a mail function of the smartphone 50 is in use as state data upon receiving a request (for example, Step S1300 in FIG. 11 described later) from the server device 30A.

The server device 30A includes the communication IF 200, a control circuit 205A, and the storage device 260. The control circuit 205A includes a memory 210A, a CPU 220A, and a peripheral circuit (not shown). The memory 210A is configured with, for example, a semiconductor memory or the like. The memory 210A includes, for example, a ROM, a RAM, an EEPROM, and the like. For example, the ROM of the memory 210A stores the control program of the second embodiment for operating the CPU 220A. The CPU 220A functions as a driving data acquisition portion 230A, the communication controller 235, and a normal data determiner 240 by operating according to the control program of the second embodiment stored in the memory 210A.

The normal data determiner 240 temporarily stores the state data transmitted from the vehicle 20A and the smartphone 50 in the memory 210A. Based on the state data transmitted from the vehicle 20A and the smartphone 50, the normal data determiner 240 determines whether or not the passenger of the vehicle 20A is in the normal state in the vehicle 20A. If determining that the passenger is in a normal state, the normal data determiner 240 determines that the data obtained from the smartphone 50 held by the passenger or the smart watch 60 worn by the passenger is reliable.

For example, based on the imaging data of the indoor camera 135, the normal data determiner 240 determines that the passenger is in a normal state when an attitude (for example, positions of the head, hands, and arms) of the passenger is constant, a line of sight of the passenger is directed in a traveling direction of the vehicle 20A, and there is little movement of the passenger from a time point at which an event trigger is determined to have occurred by the driving determiner 175 or the event determiners 330 and 430 to before the pre-storage time period T7. For example, when a difference between frame images in the imaging data of the indoor camera 135 during the pre-storage time period T7 is equal to or less than a predetermined value, the movement of the passenger can be determined to be little.

For example, based on the detection data of the belt sensor 140 and the seating sensor 145 and the state data from the smartphone 50, the normal data determiner 240 determines that the passenger is in a normal state when the passenger is seated in the passenger seat and wears the seat belt, and a call function or a mail function of the smartphone 50 is not in use from a time point at which an event trigger is determined to have occurred by the driving determiner 175 or the event determiners 330 and 430 to before the pre-storage time period T7.

For example, when the game application 365 of the smartphone 50 is not running, the normal data determiner 240 determines that the passenger is in a normal state. That is, when the passenger is using the game application 365 of the smartphone 50, the passenger is not determined to be in the normal state because there is a possibility that the passenger moves the body due to a game. For example, when the health application 370 of the smartphone 50 is running, the normal data determiner 240 determines that the passenger is in the normal state. That is, when the passenger is using the health application 370 of the smartphone 50, the passenger is in the normal state because the passenger is considered not to make an unreasonable movement.

The driving data acquisition portion 230A stores the data transmitted from the smartphone 50 or the smart watch 60 in the dangerous driving data storage 270 only when the normal data determiner 240 determines that the passenger is in the normal state. That is, when the normal data determiner 240 does not determine that the passenger is in the normal state, the driving data acquisition portion 230A does not store the data transmitted from the smartphone 50 or the smart watch 60 in the dangerous driving data storage 270.

Figure 10:
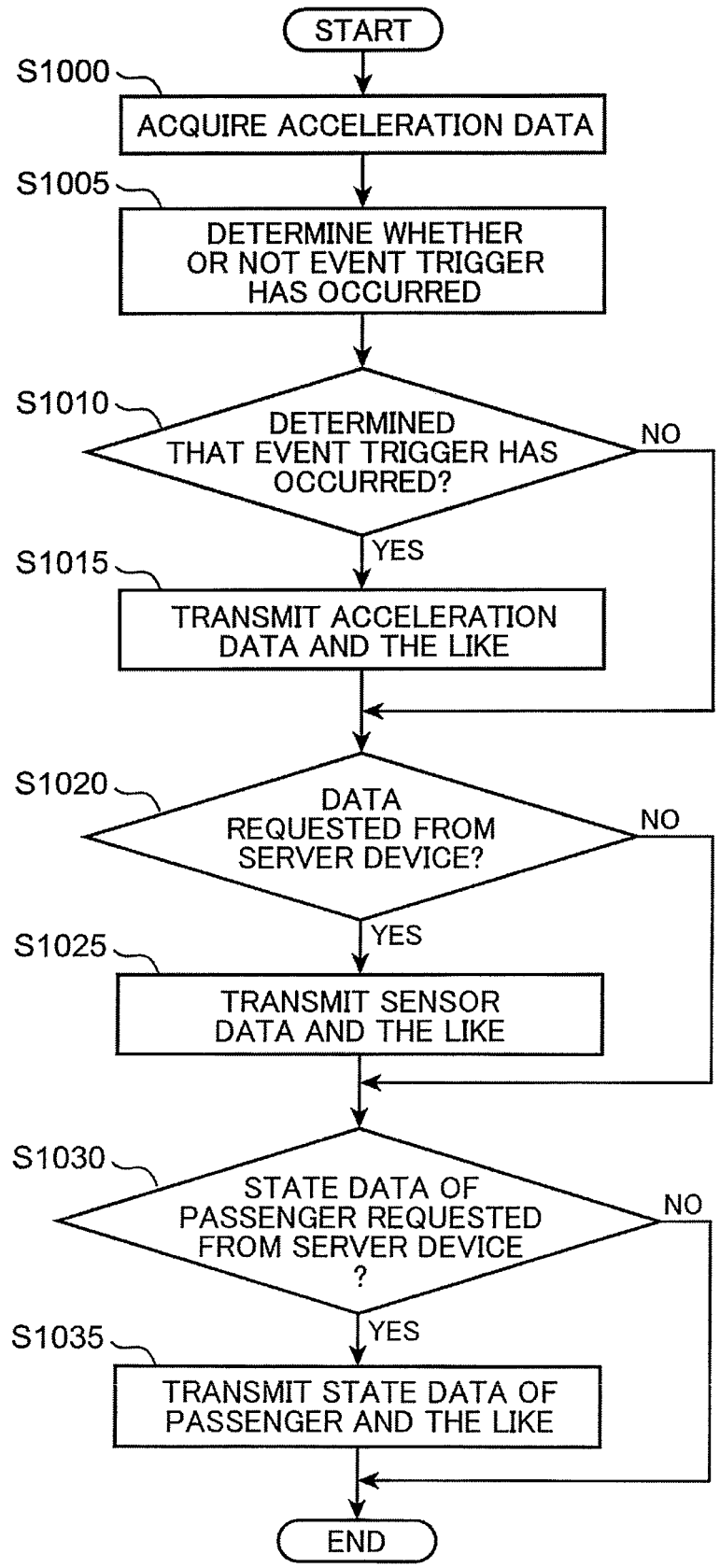
FIG. 10 is a flowchart schematically showing operation of the vehicle of the second embodiment.

FIG. 10 is a flowchart schematically showing operation in the vehicle 20A of the information collection system 10A according to the second embodiment. The operation of FIG. 10 is repeatedly executed at predetermined time intervals (for example, 10 msec).

Steps S1000 to S1025 are the same as Steps S1000 to S1025 in FIG. 6 except that the driving determiner 175 is replaced with the driving determiner 175A and the communication controller 185 is replaced with the communication controller 185A. However, if NO in Step S1020, the processing proceeds to Step S1030.

In Step S1030 following Step S1025, the communication controller 185A determines whether or not state data of the passenger, such as imaging data by the indoor camera 135, detection data of the belt sensor 140, detection data of the seating sensor 145, and the like, is requested by the server device 30A. When the state data of the passenger is requested by the server device 30A (YES in Step S1030), the processing proceeds to Step S1035. On the other hand, if the state data of the passenger is not requested by the server device 30A (NO in Step S1030), the operation of FIG. 10 ends. In Step S1035, the communication controller 185A transmits the state data and the like of the passenger to the server device 30, and the operation of FIG. 10 ends.

Note that in the operation of the smartphone 50A of the information collection system 10A according to the second embodiment, steps similar to Steps S1030 and S1035 of FIG. 10 are added to the end of the flowchart of the first embodiment shown in FIG. 7.

Figure 11:
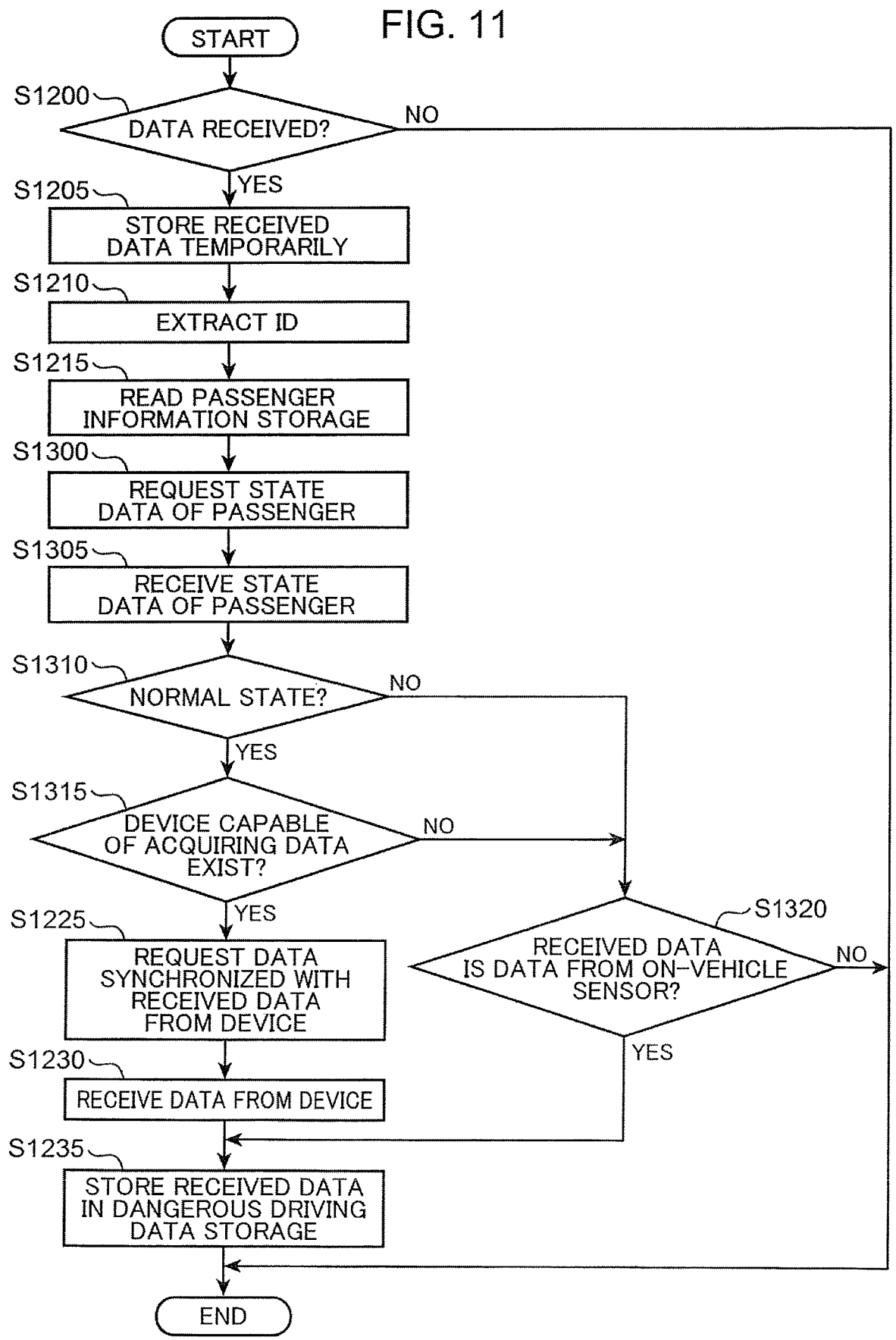
FIG. 11 is a flowchart schematically showing operation of the server device of the second embodiment.

FIG. 11 is a flowchart schematically showing the operation of the server device 30A of the information collection system 10A according to the second embodiment. The operation of FIG. 11 is repeatedly executed at predetermined time intervals (for example, 10 msec).

Steps S1200 to S1215 are the same as Steps S1200 to S1215 in FIG. 8 except that the memory 210 is replaced with the memory 210A and the driving data acquisition portion 230 is replaced with the driving data acquisition portion 230A. In Step S1300 following Step S1215, the normal data determiner 240 requests the state data of the passenger from the vehicle 20A and the smartphone 50A via the communication controller 235. In Step S1305, the communication controller 235 receives the state data of the passenger from the vehicle 20A and the smartphone 50A, and temporarily stores the received data in the memory 210A. In Step S1310, the normal data determiner 240 determines whether or not the passenger is in the normal state based on the received state data. If the passenger is in the normal state (YES in Step S1310), the processing proceeds to Step S1315. If the passenger is not in the normal state (NO in Step S1310), the processing proceeds to Step S1320.

The content of determination of Step S1315 is the same as Step S1220 of FIG. 8. That is, based on information registered in the passenger information storage 265, the driving data acquisition portion 230A determines whether or not there is a device capable of acquiring data. If there is a device capable of acquiring data (YES in Step S1315), the processing proceeds to Step S1225. On the other hand, if no device capable of acquiring data exists (NO in Step S1315), the processing proceeds to Step S1320.

In Step S1320, the driving data acquisition portion 230A determines whether or not the received data stored in memory 210A in Step S1205 is data from an on-vehicle sensor mounted on the vehicle 20A. If the received data is data from the on-vehicle sensor (YES in Step S1320), the processing proceeds to Step S1235. On the other hand, if the received data is not data from the on-vehicle sensor (NO in Step S1320), the operation of FIG. 11 ends. Steps S1225 to S1235 are the same as Steps S1225 to S1235 in FIG. 8 except that the memory 210 is replaced with the memory 210A and the driving data acquisition portion 230 is replaced with the driving data acquisition portion 230A.

If the received data is not data from the on-vehicle sensor (NO in Step S1320), it means that the received data is data from the smartphone 50A or the smart watch 60. On the other hand, here, the passenger is not in the normal state (NO in Step S1310). Therefore, the operation of FIG. 11 ends without storing the received data temporarily stored in the memory 210A in Step S1205 in the dangerous driving data storage 270.

As described above, according to the second embodiment, only when the normal data determiner 240 determines that the passenger is in the normal state, the data of the smartphone 50 or the data of the smart watch 60 is stored in the dangerous driving data storage 270. For this reason, the reliability of data stored in the dangerous driving data storage 270 can be improved.

(Others)

(1) In each of the above embodiments, as shown in FIGS. 4 and 5, the heart rate sensor 460 of the smart watch 60 outputs time data of the heart rate data Hbn and HBa, and the event determiner 430 determines whether or not an event trigger occurs based on a peak value of a correlation value with time data of the heart rate data Hbn in normal times. However, the way of determination is not limited to the above. The heart rate sensor of the smart watch 60 may detect a heart rate of the passenger. In the memory 410 of the smart watch 60, an average value and a standard deviation σ of a heart rate in normal times may be stored in advance. The event determiner 430 may determine that an event trigger has occurred when the heart rate detected by the heart rate sensor is a value increased by 2σ or 3σ from the average value.

(2) In the first embodiment, regarding the determination of the occurrence of an event trigger by the driving determiner 175, an example of an event trigger, in which the magnitude of an absolute value of an acceleration of the vehicle 20 detected by the acceleration sensor 130 exceeds the predetermined acceleration threshold value Gthc, is described. However, the content of the event trigger is not limited to the above.

For example, the driving determiner 175 may further detect an object present in the imaging range of the cameras 105F, 105B, 110L, 110R, 115L, and 115R such as, for example, other vehicles traveling in a peripheral region of the vehicle 20, a pedestrian walking in the vicinity of a traveling lane, a boundary line representing a boundary of lanes drawn on the road (for example, a white line drawn intermittently), a traffic sign installed at the side of the road, and the like by template matching, for example. Then, the driving determiner 175 may determine whether or not an event trigger, in which the speed of the vehicle 20 detected by the vehicle speed sensor 125 exceeds a speed threshold predetermined corresponding to a speed limit described on the detected traffic sign for example, has occurred.

Alternatively, for example, an event trigger occurrence condition in a relationship between a distance L20 between the vehicle 20 and a pedestrian and a speed V20 of the vehicle 20 may be determined in advance, and stored in the memory 165. The event trigger occurrence condition is set such that the velocity V20 becomes higher as the distance L20 becomes longer.

The driving determiner 175 may detect a distance Lx between the vehicle 20 and a pedestrian based on the imaging data output from the cameras 105F, 105R, 110L, 110R, 115L, and 115R and distance data output from the LIDAR 120. The driving determiner 175 may compare the detected distance Lx and the speed Vx of the vehicle 20 output from the vehicle speed sensor 125 with the event trigger occurrence condition, and may determine that an event trigger has occurred when the event trigger occurrence condition is satisfied.

There can be considered a case where, for example, when the vehicle 20 passes a spot at the distance Lx from a pedestrian at the velocity Vx, the passenger feels dangerous and the heart rate data detected by the heart rate sensor 460 becomes irregular as shown in the heart rate data Hba (FIG. 5), and the event determiner 430 determines that an event trigger has occurred. In such a case, when the distance Lx and the speed Vx do not satisfy the event trigger occurrence condition stored in the memory 165, the driving determiner 175 does not determine that an event trigger has occurred. However, it is not preferable that the driving determiner 175 do not determine that an event trigger has occurred even though the passenger of the vehicle 20 feels dangerous.

On the other hand, in this modified embodiment, when the event determiner 430 of the smart watch 60 determines that an event trigger has occurred, the heart rate data detected by the heart rate sensor 460, the distance Lx, and the velocity Vx are transmitted to the server device 30, and stored in the dangerous driving data storage 270 of the server device 30 as dangerous driving information.

Therefore, the heart rate data detected by the heart rate sensor 460, the distance Lx, and the velocity Vx stored in the dangerous driving data storage 270 can be used to correct the event trigger occurrence condition. This makes it possible to match the event trigger occurrence condition with the feeling of the passenger.

(3) In each of the above embodiments, each of the vehicles 20 and 20A includes the drive recorder 128 having the acceleration sensor 130 as the on-vehicle terminal, but the on-vehicle terminal is not limited to this configuration. The vehicles 20 and 20A may be equipped with a smartphone having an acceleration sensor for example, in place of or in addition to the drive recorder 128 as the on-vehicle terminal. Alternatively, a smartphone with an acceleration sensor held by the driver may be used as the on-vehicle terminal.

(4) In each of the above embodiments, although the information collection systems 10 and 10A are provided with the smartphone 50 and the smart watch 60, the configuration is not limited to the above. The information collection systems 10 and 10A may include only one of the smartphone 50 and the smart watch 60. That is, the information collection systems 10 and 10A may be provided with at least one of the smartphone 50 and the smart watch 60.

(5) In the above embodiments, the pre-storage time periods Ta, T1, T3, T5, and T7 may be the same value or different values. Further, the post-preservation time periods Tb, T2, T4, T6, and T8 may be the same value or different values.

(6) In the above second embodiment, the smartphone 50A is installed with the game application 365 that enables execution of a computer game and the health application 370 that enables measurement of a heart rate or blood pressure. However, the configuration is not limited to the above. For example, the information collection system may include a gaming device of a single body capable of executing a computer game and a health device of a single body capable of measuring a heart rate or blood pressure. In this case, a device ID of the gaming device and a device ID of the health device are preferably registered in the passenger information storage 265 of the server device 30. Then, when the gaming device is not running, the normal data determiner 240 may determine that the passenger is in the normal state. Further, the normal data determiner 240 may determine that the passenger is in the normal state when the health device is running.

The information collection technique according to the present disclosure is particularly useful for a system that collects driving information of a vehicle.

This application is based on Japanese Patent application No. 2018-146889 filed in Japan Patent Office on Aug. 3, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. An information collection method used in an information collection system for collecting dangerous driving information indicating that driving of a vehicle performed by a driver is dangerous driving, wherein a processor of the information collection system:
　acquires event sensor data and identification information from an on-vehicle terminal or from a passenger terminal, the event sensor data being sensor data output, in response to a predetermined event trigger relating to the dangerous driving, from an on-vehicle sensor mounted on the on-vehicle terminal or from a passenger sensor mounted on the passenger terminal held by a passenger riding on the vehicle with the driver, the identification information identifying an output source of the event sensor data;
　identifies, in a case where the acquired identification information indicates the on-vehicle terminal, the passenger terminal associated with the acquired identification information with reference to a first memory, the first memory storing identification information of the on-vehicle terminal and identification information of the passenger terminal in association with each other;
　identifies, in a case where the acquired identification information indicates the passenger terminal, the on-vehicle terminal associated with the acquired identification information with reference to the first memory;
　requests sensor data from the identified passenger terminal or from the identified on-vehicle terminal;
　acquires the sensor data from the passenger terminal or from the on-vehicle terminal which is a request destination from which the sensor data has been requested; and
　stores the acquired event sensor data and the sensor data acquired from the request destination in association with each other in a second memory as the dangerous driving information.

2. The information collection method according to claim 1, wherein
　in the acquisition of the event sensor data,
　　an acceleration of the vehicle output from the on-vehicle sensor in response to the event trigger, in which an absolute value of an acceleration of the vehicle detected by the on-vehicle sensor exceeds a predetermined on-vehicle threshold value, is acquired as the event sensor data, or
　　an acceleration of the vehicle output from the passenger sensor in response to the event trigger, in which an absolute value of an acceleration of the vehicle detected by the passenger sensor exceeds a predetermined terminal threshold value, is acquired as the event sensor data.

3. The information collection method according to claim 1, wherein
　in the acquisition of the event sensor data,
　　an acceleration of the vehicle output from the on-vehicle sensor in response to the event trigger, in which an absolute value of an acceleration of the vehicle detected by the on-vehicle sensor exceeds a predetermined on-vehicle threshold value, is acquired as the event sensor data, or
　　heart rate data of the passenger output from the passenger sensor in response to the event trigger, in which a difference between heart rate data of the passenger detected by the passenger sensor and heart rate data in normal times exceeds a predetermined heart rate threshold value, is acquired as the event sensor data.

4. The information collection method according to claim 1, wherein
　the processor of the information collection system further requests state data indicating whether or not the passenger is in a normal state in the vehicle, from the on-vehicle terminal which is the output source of the event sensor data or the request destination, and
　acquires the state data from the on-vehicle terminal from which the state data has been requested, and
　in the storage, the event sensor data acquired from the passenger sensor or the sensor data acquired from the passenger sensor which is the request destination is stored in the second memory, only when the acquired state data indicates that the passenger is in a normal state.

5. An information collection system for collecting dangerous driving information indicating that driving of a vehicle performed by a driver is dangerous driving, the information collection system comprising:
　a first acquisition portion configured to acquire event sensor data and identification information from an on-vehicle terminal or from a passenger terminal, the event sensor data being sensor data output, in response to a predetermined event trigger relating to the dangerous driving, from an on-vehicle sensor mounted on the on-vehicle terminal or from a passenger sensor mounted on the passenger terminal held by a passenger riding on the vehicle with the driver, the identification information identifying an output source of the event sensor data;
　a first memory configured to store identification information of the on-vehicle terminal and identification information of the passenger terminal in association with each other;
　a first identification portion configured to identify, in a case where the acquired identification information indicates the on-vehicle terminal, the passenger terminal associated with the acquired identification information with reference to the first memory;
　a second identification portion configured to identify, in a case where the acquired identification information indicates the passenger terminal, the on-vehicle terminal associated with the acquired identification information with reference to the first memory;
　a requesting portion configured to request sensor data from the identified passenger terminal or from the identified on-vehicle terminal;
　a second acquisition portion configured to acquire the sensor data from the passenger terminal or from the on-vehicle terminal which is a request destination from which the sensor data has been requested; and
　a second memory configured to store the dangerous driving information; and
　a storage controller configured to store the acquired event sensor data and the sensor data acquired from the request destination in association with each other in the second memory as the dangerous driving information.

6. A non-transitory computer-readable recording medium storing an information collection program used in an information collection system for collecting dangerous driving information indicating that driving of a vehicle performed by a driver is dangerous driving, the program causing a processor of the information collection system to execute:
　processing of acquiring event sensor data and identification information from an on-vehicle terminal or from a passenger terminal, the event sensor data being sensor data output, in response to a predetermined event trigger relating to the dangerous driving, from an on-vehicle sensor mounted on the on-vehicle terminal or from a passenger sensor mounted on the passenger terminal held by a passenger riding on the vehicle with the driver, the identification information identifying an output source of the event sensor data;

processing of identifying, in a case where the acquired identification information indicates the on-vehicle terminal, the passenger terminal associated with the acquired identification information with reference to a first memory, the first memory storing identification information of the on-vehicle terminal and identification information of the passenger terminal in association with each other;

processing of identifying, in a case where the acquired identification information indicates the passenger terminal, the on-vehicle terminal associated with the acquired identification information with reference to the first memory;

processing of requesting sensor data from the identified passenger terminal or from the identified on-vehicle terminal;

processing of acquiring the sensor data from the passenger terminal or from the on-vehicle terminal which is a request destination from which the sensor data has been requested; and processing of storing the acquired event sensor data and the sensor data acquired from the request destination in association with each other in a second memory as the dangerous driving information.

* * * * *